US012754419B2

(12) United States Patent
Imamura et al.

(10) Patent No.: US 12,754,419 B2
(45) Date of Patent: Oct. 6, 2026

(54) DISPLAY DEVICE AND DISPLAY SYSTEM

(71) Applicant: Panasonic Automotive Systems Co., Ltd., Kanagawa (JP)

(72) Inventors: Norihiro Imamura, Osaka (JP); Kenji Nagatomi, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 239 days.

(21) Appl. No.: 18/630,311

(22) Filed: Apr. 9, 2024

(65) Prior Publication Data

US 2024/0393585 A1 Nov. 28, 2024

(30) Foreign Application Priority Data

May 26, 2023 (JP) ................................ 2023-086861
Oct. 31, 2023 (JP) ................................ 2023-186497

(51) Int. Cl.
*G02B 27/01* (2006.01)

(52) U.S. Cl.
CPC ................................ *G02B 27/0101* (2013.01)

(58) Field of Classification Search
CPC .... G02B 27/0101; G02B 30/22; G02B 27/42; G02F 2203/62; G06T 19/006
See application file for complete search history.

(56) References Cited

U.S. PATENT DOCUMENTS

| | | | | |
|---|---|---|---|---|
| 2004/0108971 A1* | 6/2004 | Waldern | G02B 27/017 | 345/8 |
| 2007/0008240 A1* | 1/2007 | Kurahashi | G02B 30/52 | 348/E13.057 |
| 2010/0177025 A1* | 7/2010 | Nagata | G02B 27/0101 | 345/76 |
| 2013/0278595 A1* | 10/2013 | Kang | H04N 13/398 | 345/419 |
| 2021/0080763 A1* | 3/2021 | Sulai | G02B 3/08 | |
| 2022/0004013 A1* | 1/2022 | Nagatomi | G02B 5/3025 | |
| 2023/0004001 A1* | 1/2023 | Sulyok | G02B 27/0101 | |
| 2023/0375869 A1* | 11/2023 | Kitazumi | G02F 1/13471 | |

FOREIGN PATENT DOCUMENTS

JP 2007-17768 1/2007

* cited by examiner

*Primary Examiner* — Mustak Choudhury
(74) *Attorney, Agent, or Firm* — Greenblum & Bernstein, P.L.C.

(57) ABSTRACT

A display device includes: a display that emits image light; an optical element that is disposed away from the display, the optical element being switchable between a first state in which the optical element reflects the image light and a second state in which the optical element transmits the image light; a first reflector that is disposed on an opposite side of the optical element relative to a side on which the display is disposed; and a controller that controls the display and the optical element. When the controller causes the display to repeatedly output a first image and a second image in an alternating manner, the controller switches the optical element between the first state and the second state in synchronization with the first image and the second image.

16 Claims, 23 Drawing Sheets

DISPLAY DEVICE AND DISPLAY SYSTEM

CROSS REFERENCE TO RELATED APPLICATIONS

The present application is based on and claims priority of Japanese Patent Application No. 2023-086861 filed on May 26, 2023, and Japanese Patent Application No. 2023-186497 filed on Oct. 31, 2023.

FIELD

The present disclosure relates to a display device and a display system.

BACKGROUND

Patent Literature (PTL) 1 discloses a display device in which a plurality of display panels (displays) are arranged from a front side to a back side in an overlapped manner and images are displayed on the respective display panels to generate a three-dimensional image.

CITATION LIST

Patent Literature

PTL 1: Japanese Unexamined Patent Application Publication No. 2007-17768

SUMMARY

However, the display device according to PTL 1 can be improved upon.

In view of this, the present disclosure provides a display device and the like capable of improving upon the above related art.

A display device according to one aspect of the present disclosure includes: a display that emits image light; an optical element that is disposed away from the display, the optical element being switchable between a first state in which the optical element reflects the image light and a second state in which the optical element transmits the image light; a first reflector that is disposed on an opposite side of the optical element relative to a side on which the display is disposed; and a controller that controls the display and the optical element. When causing the display to repeatedly output a first image and a second image in an alternating manner, the controller switches the optical element between the first state and the second state in synchronization with the first image and the second image.

A display system according to one aspect of the present disclosure includes the display device described above.

A display device according to the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

Figure 1:
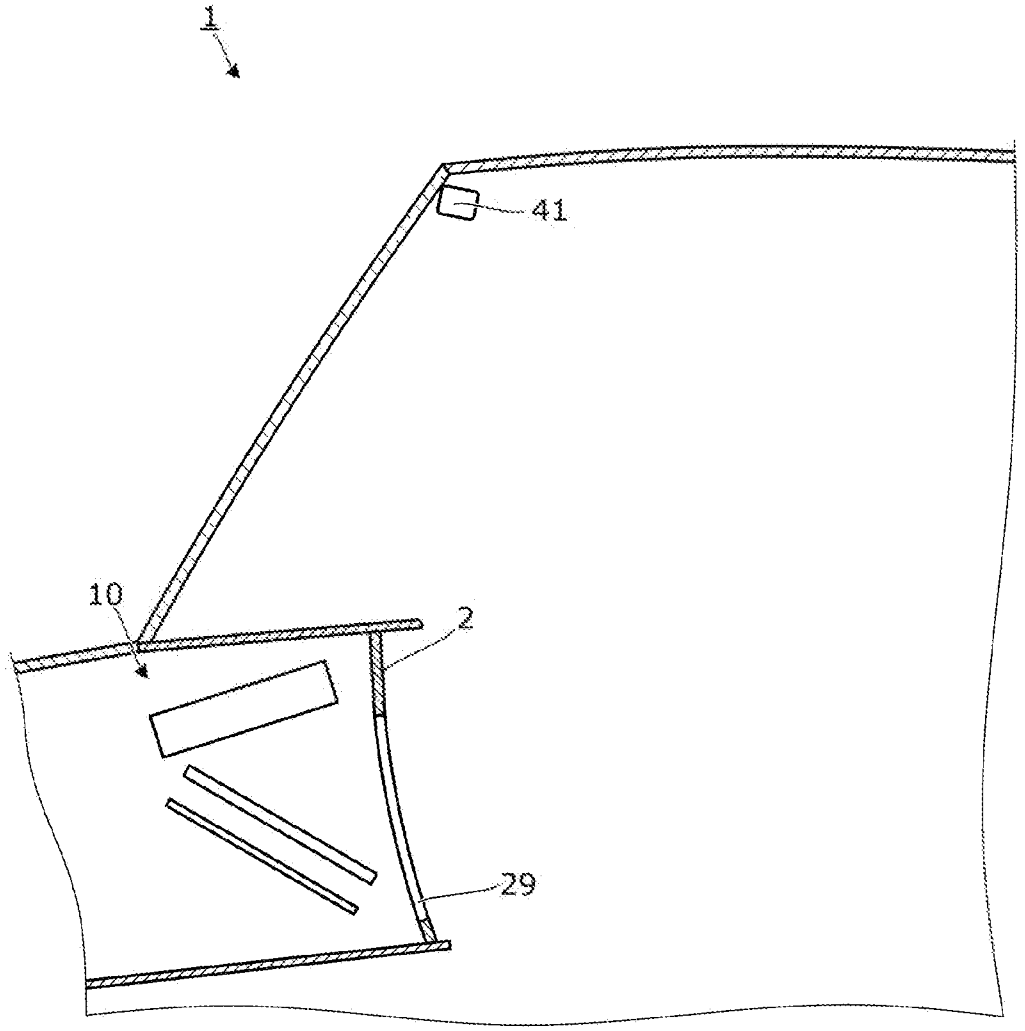
FIG. 1 is a schematic diagram illustrating a state where a display device according to Embodiment 1 is provided in a vehicle.

DESCRIPTION OF EMBODIMENTS (Underlying Knowledge Forming Basis of the Present Disclosure)

The inventors of the present disclosure have found that the following problems arise in relation to the display device described in the "Background" section. For example, there is a need to reduce the number of displays provided in order to reduce costs. In other words, the present disclosure provides a display device and the like capable of generating a three-dimensional image without using a plurality of displays.

A display device according to one aspect of the present disclosure includes: a display that emits image light; an optical element that is disposed away from the display, the optical element being switchable between a first state in which the optical element reflects the image light and a second state in which the optical element transmits the image light; a first reflector that is disposed on an opposite side of the optical element relative to a side on which the display is disposed; and a controller that controls the display and the optical element. When causing the display to repeatedly output a first image and a second image in an alternating manner, the controller switches the optical element between the first state and the second state in synchronization with the first image and the second image.

With this, the optical element is switched between the first state and the second state in synchronization with the repeated output of the first image and the second image in an alternating manner. In other words, when the first image is output, the optical element is in the first state, and the image light forming the first image is reflected by the optical element and reaches the user. On the other hand, when the second image is output, the optical element is in the second state, and the image light forming the second image passes through the optical element, is reflected by the first reflector, and then reaches the user. With this, the viewing distance of the image light forming the second image is longer than the viewing distance of the image light forming the first image. When the first image is a closer image and the second image is a farther image, the closer image is projected closer to the user and the farther image is projected farther away from the user. Thus, the user is able to visually recognize a three-dimensional image. In such a manner, a three-dimensional image can be generated even without a plurality of displays.

Moreover, it may be that the optical element includes a liquid crystal layer, and a first polarizing plate and a second polarizing plate that sandwich the liquid crystal layer, the first polarizing plate is a transmissive polarizing plate where the image light enters, and the second polarizing plate is a reflective polarizing plate.

With this, since the first polarizing plate is a transmissive polarizing plate, it is possible to reduce unwanted reflected light compared to the case where the first polarizing plate is a reflective polarizing plate.

Moreover, it may be that the display device includes a half mirror that is disposed between the display and the optical element.

With this, a half mirror is disposed between the display and the optical element. Hence, it is possible to cause the image light to enter the optical element substantially perpendicularly by causing the half mirror to reflect the image light. A characteristic of the polarizing plate in the optical element is that the degree of polarization increases the more perpendicularly light enters the polarizing plate. Therefore, the half mirror is capable of increasing the degree of separation of polarized light, leading to an increase in image quality.

Moreover, it may be that the display device includes a second reflector that is disposed on an optical path of the image light emitted from the display.

With this, by causing the second reflector to reflect image light, the viewing distance of the image light can be increased. Therefore, it is possible to generate a three-dimensional image with a greater sense of depth.

Moreover, it may be that the first reflector includes a first region and a second region, the first region being positioned opposite to the optical element, the second region being positioned not directly opposite to the optical element.

With this, a three-dimensional image can be generated in the first region, and a two-dimensional image can be generated in the second region. Therefore, the three-dimensional image and the second-dimensional image can be represented collectively. Furthermore, the size of the optical element can be reduced, as the optical element only needs to be sized to oppose only the first region of the first reflector.

Moreover, it may be that when the controller detects an abnormality in the optical element, the controller causes the display to output a third image corresponding to the abnormality.

With this, in the event of an abnormality in the optical element, a third image corresponding to the abnormality can be output from the display. Therefore, even in abnormal situations where three-dimensional images cannot be generated, a third image corresponding to a two-dimensional image can be output, so that a two-dimensional image can be displayed.

Moreover, it may be that the first image is identical to the second image, and when the controller causes the display to repeatedly output the first image and the second image in an alternating manner, the controller switches the optical element between the first state and the second state every predetermined period that allows the switching to be visually recognized.

With this, when the first image and the second image are repeatedly output on display in an alternating manner, the optical element is repeatedly switched between the first state and the second state every predetermined period that allows the switching to be visually recognized. Since the first image and the second image are identical to each other, the identical image is displayed at different viewing distances. The images are highlighted in this way, making it easier for the user to notice the images.

Moreover, it may be that, when the first image is defined by the image light displayed when the optical element is in the first state and the second image is defined by the image light displayed when the optical element is in the second state, the controller: (i) causes the display to output the first image to gradually reduce a size of the first image from an initial size to a first predetermined size, while keeping the optical element in the first state, the first predetermined size being smaller than the initial size; (ii) switches the optical element to the second state after the size of the first image reaches the first predetermined size; (iii) causes the display to output the second image to gradually reduce a size of the second image from a second predetermined size to a third predetermined size, while keeping the optical element in the second state, the second predetermined size being smaller than the first predetermined size, the third predetermined size being smaller than the second predetermined size; (iv) causes the display to output the second image to gradually increase the size of the second image to the second predetermined size, when the size of the second image reaches the third predetermined size; (v) switches the optical element to the first state after the size of the second image reaches the second predetermined size; and (vi) causes the display to output the first image to gradually increase the size of the first image from the first predetermined size to the initial size, while keeping the optical element in the first state.

With this, the sizes of the first image and the second image are increased or reduced in an animated manner, making it easier for the user to notice the first image and the second image.

Moreover, it may be that the first reflector includes a first reflective region and a second reflective region that are positioned at different distances from the optical element.

In this way, the viewing distance of the image formed by the image light reflected by the first reflective region can be set different from the viewing distance of the image formed by the image light reflected by the second reflective region. This allows three dimensional display to be performed in a wider variety of ways.

Moreover, it may be that the first reflective region is positioned farther from the optical element than the second reflective region is, and the optical element includes a portion that is kept only in the second state, the portion corresponding to the first reflective region.

With this, it is possible to set the viewing distance of the image formed by the image light reflected by the first reflective region longer than the viewing distance of the image formed by the image light reflected by the second reflective region. Since the portion of the optical element corresponding to the first reflective region is kept only in the second state, the image with a long viewing distance allows easy visibility and a wider variety of displays.

Moreover, it may be that the first reflective region is positioned farther from the optical element than the second reflective region is, and the optical element exposes the first reflective region.

With this, it is possible to set the viewing distance of the image formed by the image light reflected by the first reflective region longer than the viewing distance of the image formed by the image light reflected by the second reflective region. Since the first reflective region of the optical element is exposed, light attenuation can be reduced in the image with a long viewing distance, allowing easy visibility and a wider variety of displays.

Moreover, it may be that the first reflective region is a concave mirror.

With this, since the first reflective region is a concave mirror, the image formed by the image light reflected by the first reflective region is displayed farther by the concave mirror than the image formed by the image light reflected by the second reflective region, providing a sense of depth.

Moreover, it may be that the display system includes the display device described above.

With this, the same advantageous effects as the display device described above can be obtained.

Moreover, it may be that the display system includes a user detector that detects a user who views an image that is based on the image light, in which the controller adjusts at least one of a position of the first image or a position of the second image based on a result of detection performed by the user detector.

With this, at least one of the position of the first image or the position of the second image is adjusted based on the user detected by the user detector, so that degradation of the three-dimensional image due to ghost images can be reduced.

Moreover, it may be that the display system includes: a user detector that detects a user who views an image that is based on the image light, in which the controller adjusts at least one of a shape of the first image or a shape of the second image based on a result of detection performed by the user detector.

With this, at least one of the shape of the first image or the shape of the second image is adjusted based on the user detected by the user detector, so that a three-dimensional image suitable for the user can be generated.

Moreover, it may be that the display system includes a user detector that detects a user who views an image that is based on the image light, in which the controller adjusts a first one of a magnification of the first image or a magnification of the second image relative to a second one of the magnification of the first image or the magnification of the second image, based on a result of detection performed by the user detector.

With this, one of the magnification of the first image or the magnification of the second image is adjusted relative to the other magnification, the first image and the second image can be overlapped to each other appropriately.

EMBODIMENTS

Hereinafter, embodiments will be specifically described with reference to the drawings. Each embodiment described below shows a specific example of the present disclosure. The numerical values, shapes, materials, structural elements, the arrangement and connection of the structural elements, steps, the processing order of the steps etc. shown in the following embodiments are mere examples, and therefore do not limit the present disclosure. Among the structural elements in the following embodiments, structural elements not recited in any one of the independent claims defining the most generic concept are described as arbitrary structural elements.

In the following embodiments, language such as parallel or perpendicular may be used to indicate the relative orientation of two directions, but this includes cases where the orientation is not as exactly stated. For example, "two directions are parallel" includes, in addition to exactly parallel, substantially parallel, that is to say, for example, includes a margin of error of about a few percent, unless otherwise noted.

The optical paths illustrated in the drawings in the following embodiments indicate principle ideas, and do not necessarily reflect actual optical paths.

Embodiment 1

FIG. 1 is a schematic diagram illustrating a state where display device 10 according to Embodiment 1 is provided in vehicle 1. FIG. 1 illustrates a cross section of vehicle 1.

As illustrated in FIG. 1, display device 10 is provided in center console 2 in vehicle 1. Display device 10 is a device for displaying an image. For example, display device 10 displays vehicle information related to vehicle 1. The user who is the driver of vehicle 1 is able to visually recognize the vehicle information by looking at display device 10. Examples of the vehicle information include vehicle speed of vehicle 1, engine speed of vehicle 1, detection results of objects in proximity to vehicle 1, navigation information from the current location to the destination of vehicle 1, and image information captured by a camera that images the rear region of vehicle 1. Although FIG. 1 illustrates the case where display device 10 is provided in center console 2 as an example, the position where display device 10 is provided is not limited to such an example. Display device 10 may be provided, for example, near the upper edge of the windshield or on the dashboard.

Center console 2 includes opening 29 for emitting, towards the user, light emitted from display device 10.

Opening 29 may be covered by a transparent plate for dust protection. The structural elements of display device 10 are housed in center console 2.

Figure 2:
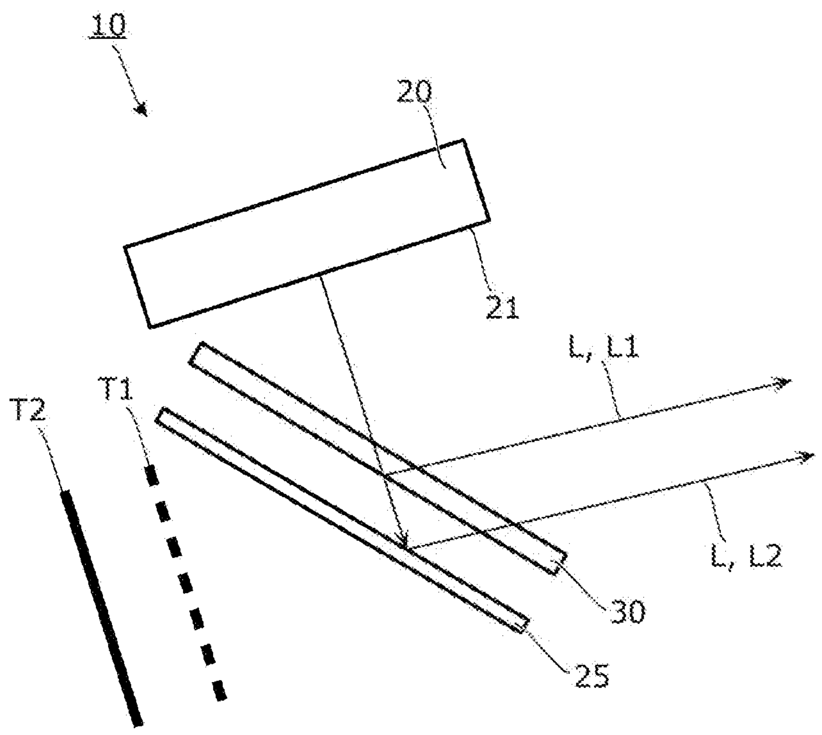
FIG. 2 is a schematic diagram illustrating a configuration of the display device according to Embodiment 1.

FIG. 2 is a schematic diagram illustrating a configuration of display device 10 according to Embodiment 1. As illustrated in FIG. 2, display device 10 includes display 20, first reflector 25, and optical element 30.

Display 20 is a display element that includes display surface 21. Display 20 emits image light forming a display image (such as first image g1 and second image g2 to be described later) from display surface 21. Examples of display 20 include a liquid crystal display (LCD), an organic electro luminescent (EL) display, and a micro light emitting diode (LED) display. Display surface 21 of display 20 is entirely flat. Display 20 is rectangular in plan view, and is arranged such that display surface 21 faces downwards. Specifically, display 20 is arranged in an orientation that display surface 21 faces obliquely downwards and rearwards of vehicle 1.

First reflector 25 is a flat total reflective mirror, and is positioned away from display 20. Specifically, first reflector 25 is positioned below display 20. Optical element 30 is inclined with respect to display surface 21 of display 20.

Optical element 30 is a flat liquid crystal mirror, and is switchable between a first state in which optical element 30 reflects image light and a second state in which optical element 30 transmits image light. Optical element 30 is positioned between display 20 and first reflector 25, and away from display 20 and first reflector 25. Optical element 30 is disposed parallel to first reflector 25.

Figure 3A:
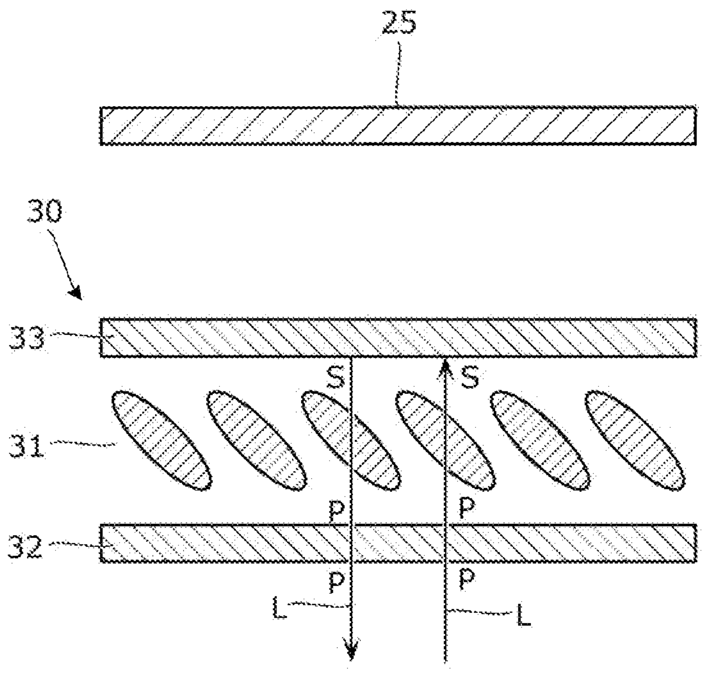
FIG. 3A is a schematic diagram illustrating a first state of an optical element according to Embodiment 1.
Figure 3B:
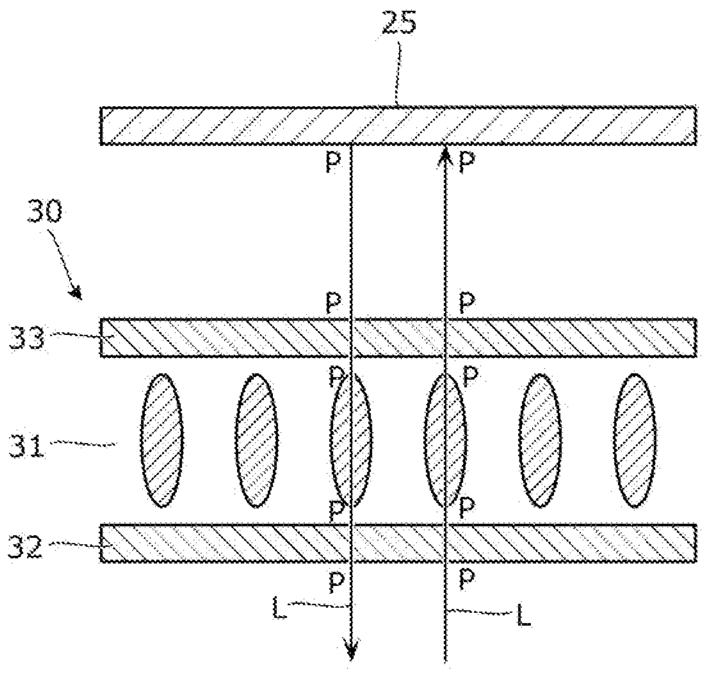
FIG. 3B is a schematic diagram illustrating a second state of the optical element according to Embodiment 1.

FIG. 3A is a schematic diagram illustrating the first state of optical element 30 according to Embodiment 1. FIG. 3B is a schematic diagram illustrating the second state of optical element 30 according to Embodiment 1. As FIG. 3A and FIG. 3B are diagrams for explaining the principles, a glass substrate, a transparent electrode, an alignment film, and the like are omitted. As illustrated in FIG. 3A and FIG. 3B, optical element 30 includes liquid crystal layer 31, and first polarizing plate 32 and second polarizing plate 33 that sandwich liquid crystal layer 31. First polarizing plate 32 is disposed on the side of liquid crystal layer 31 on which display 20 is disposed, and second polarizing plate 33 is disposed opposite to first polarizing plate 32. For example, first polarizing plate 32 is a transmissive polarizing plate that transmits linearly polarized light of p-polarized light (hereinafter referred to as "p-polarized light") and absorbs other polarized light. First polarizing plate 32 may be a reflective polarizing plate that transmits p-polarized light and reflects other polarized light. Second polarizing plate 33 is a reflective polarizing plate that transmits p-polarized light and reflects linearly polarized light of s-polarized light (hereinafter referred to as "s-polarized light").

FIG. 3A illustrates the case where p-polarized image light L is emitted from display 20 in the first state. At this time, no voltage is applied to liquid crystal layer 31, and a large number of liquid crystal molecules contained in liquid crystal layer 31 are arranged in an orientation that enables conversion of p-polarized light into s-polarized light. Therefore, p-polarized image light L is converted to s-polarized light by passing through first polarizing plate 32 and then passing through liquid crystal layer 31. This s-polarized image light L is reflected by second polarizing plate 33. S-polarized image light L after the reflection is converted to p-polarized light by passing through liquid crystal layer 31 again. As a result, p-polarized image light L passes through first polarizing plate 32 and is emitted from optical element 30 towards the user. In the first state, the distance between optical element 30 and first reflector 25 is not included in the viewing distance of image light L for the user.

FIG. 3B illustrates the second state where p-polarized image light L is emitted from display 20. At this time, voltage is applied to liquid crystal layer 31, and a large number of liquid crystal molecules contained in liquid crystal layer 31 are arranged in an orientation that enables the transmission of p-polarized light while being remained as p-polarized light. Therefore, p-polarized image light L passes through first polarizing plate 32 and liquid crystal layer 31, passes through second polarizing plate 33, and then exiting optical element 30. After exiting, p-polarized image light L is reflected by first reflector 25, and then enters second polarizing plate 33 of optical element 30. P-polarized image light L passes through second polarizing plate 33, liquid crystal layer 31, and first polarizing plate 32, and is emitted from optical element 30 towards the user. In this second state, the distance between optical element 30 and first reflector 25 (strictly speaking, the round trip of the distance) is included in the viewing distance of image light L for the user. Accordingly, the viewing distance in the second state is longer than the viewing distance in the first state. Therefore, as illustrated in FIG. 2, the display image formed by image light L in the first state (image light L1 to be described later) is viewed by the user at closer position T1 and the display image formed by image light L in the second state (image light L2 to be described later) is viewed by the user at farther position T2.

Figure 4:
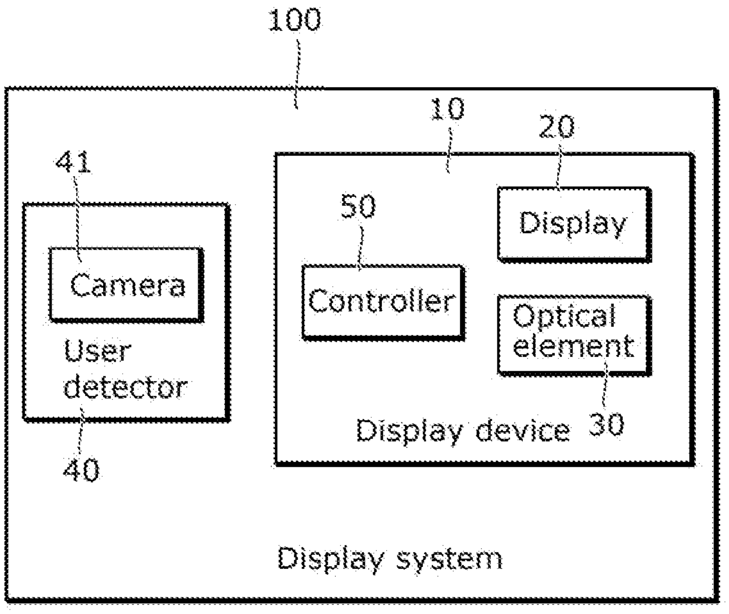
FIG. 4 is a block diagram of control configuration of a display system including the display device according to Embodiment 1.

FIG. 4 a block diagram illustrating control configuration of display system 100 including display device 10 according to Embodiment 1. As illustrated in FIG. 4, display system 100 includes user detector 40 and display device 10.

User detector 40 is a device for detecting the user in the vehicle. Specifically, user detector 40 includes camera 41 that captures an image of the user. User detector 40 is capable of detecting user information, including the user's viewpoint position, the distance between user detector 40 and the user, the user's posture, etc., by applying various image processing to the image captured by the camera. FIG. 1 illustrates an example where camera 41 is provided at the upper edge of the windscreen, but camera 41 may be provided at any position as long as an image of the user can be taken. For example, camera 41 may be provided in center console 2.

Display device 10 includes controller 50 for controlling display 20 and optical element 30.

Controller 50 is electrically connected to display 20, optical element 30, and user detector 40 to control display 20, optical element 30, and user detector 40. Specifically, controller 50 includes a central processing unit (CPU), random access memory (RAM), read only memory (ROM), etc. The CPU executes each process by loading the program included in the ROM onto the RAM and executing the program. Controller 50 may detect user information based on the image from camera 41. In this case, controller 50 functions as part of the user detector.

Figure 5:
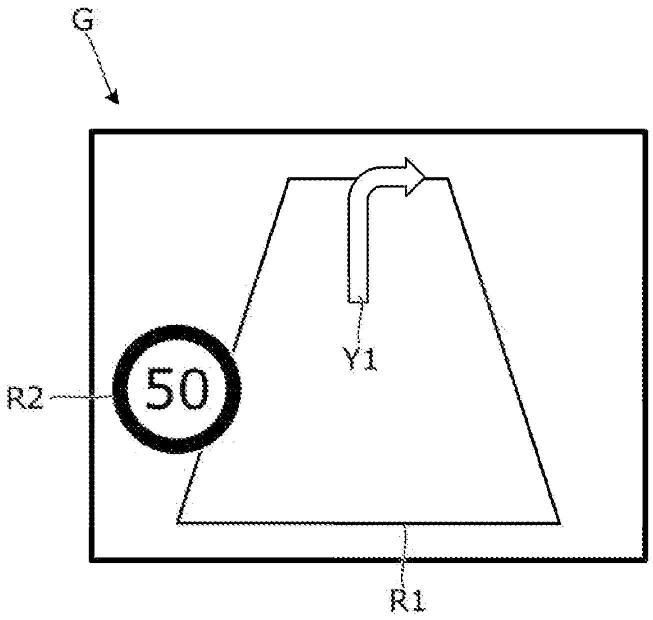
FIG. 5 is an explanatory diagram illustrating an example of a base image displayed on a display according to Embodiment 1.

Controller 50 is also electrically connected to various sensors included in vehicle 1. Controller 50 generates an image to be displayed on display 20 including the information obtained from the various sensors. FIG. 5 is an explanatory diagram illustrating an example of base image G displayed on display 20 according to Embodiment 1. Base image G illustrated in FIG. 5 includes road R1 visible in front of vehicle 1, arrow Y1 indicating the direction of subsequent travel and road sign R2. Controller 50 generates first image g1 and second image g2 for three-dimensional display based on base image G.

Figure 6:
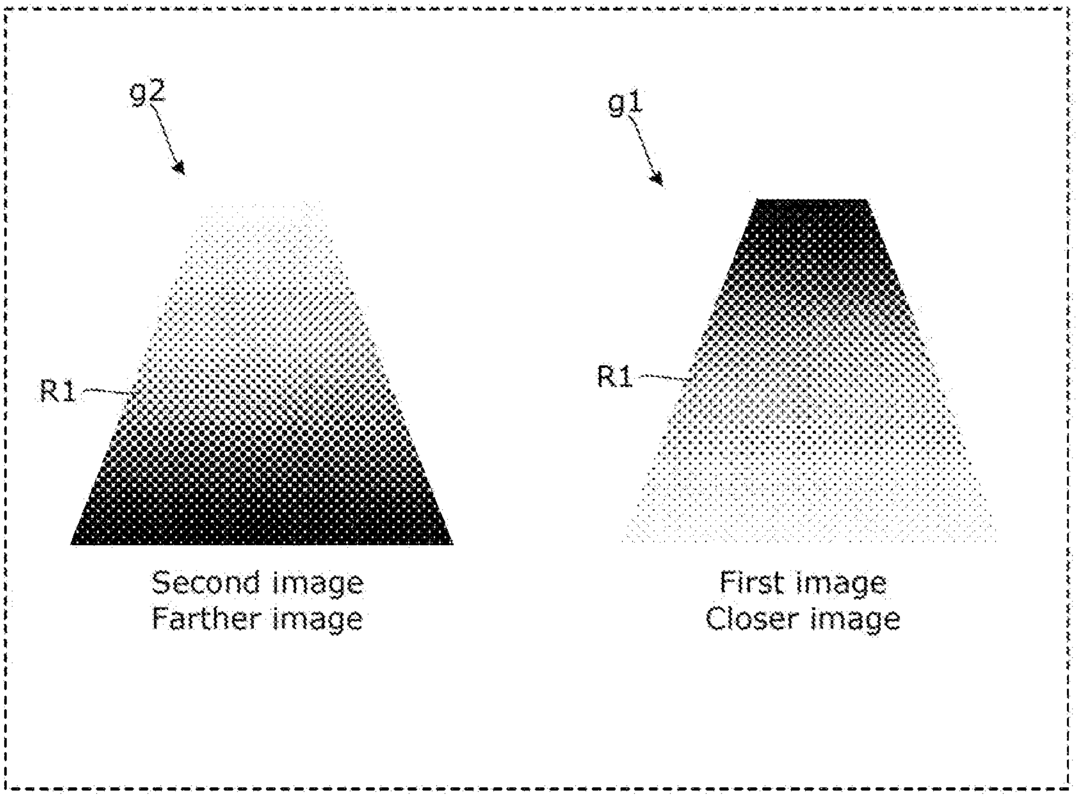
FIG. 6 is an explanatory diagram illustrating an example of a first image and a second image according to Embodiment 1.

FIG. 6 is an explanatory diagram illustrating an example of first image g1 and second image g2 according to Embodiment 1. In FIG. 6, only road R1 included in first image g1 and road R1 included in second image g2 are extracted for illustrative purposes. In addition, in FIG. 6, brightness is represented by the shadings of the dot hatching. Specifically, the lighter areas of dot hatching are brighter and the darker areas of dot hatching are darker.

First image g1 is a closer image and second image g2 is a farther image. In first image g1, which is a closer image, the front of road R1 is lightened and the back of road R1 is darkened in order to enhance the three-dimensional effect. On the other hand, in second image g2, which is a farther image, the front of road R1 is darkened and the back of road R1 is lightened.

When controller causes display 20 to repeatedly output first image g1 and second image g2 in an alternating manner, controller 50 switches optical element 30 between the first state and the second state in synchronization with first image g1 and second image g2. Specifically, controller 50 switches optical element 30 to the first state at the timing of output of first image g1, and switches optical element 30 to the second state at the timing of output of second image g2. For example, when images are output at 30 frames per second (30 fps), controller 50 outputs first image g1 and switches optical element 30 to the first state at odd frames, and outputs second image g2 and switches optical element 30 to the second state at even frames. At this time, controller 50 displays first image g1 and second image g2 by misaligning them relative to each other in the vertical direction so that first image g1 and second image g2 appear to overlap to each other for the user.

This causes first image g1 to appear at closer position T1 at odd frames and second image g2 to appear at farther position T2 at even frames. In such a manner, first image g1 and second image g2 are switched rapidly at different positions in the depth direction, so that the user is able to visually recognize a three-dimensional image with a sense of depth.

Figure 7:
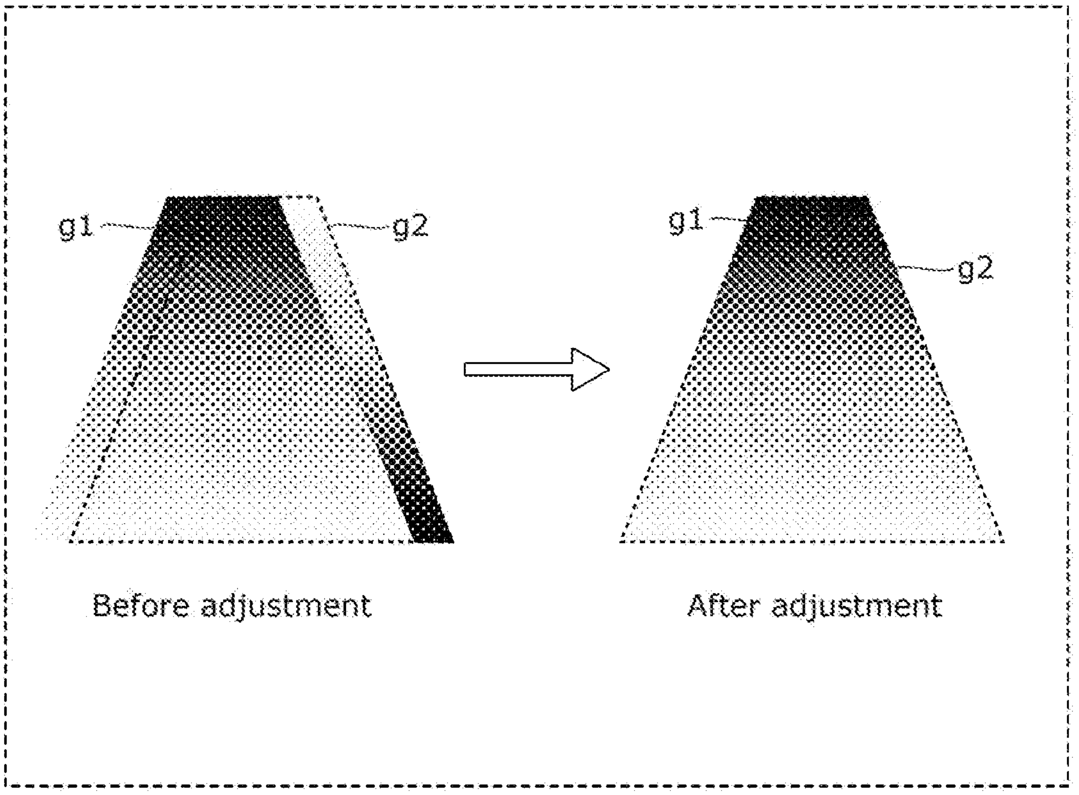
FIG. 7 is an explanatory diagram illustrating states of the first image and the second image before and after position adjustment according to Embodiment 1.

Here, controller 50 may adjust the positions of first image g1 and second image g2 based on the result of detection performed by user detector 40. FIG. 7 is an explanatory diagram illustrating states of first image g1 and second image g2 before and after position adjustment. In FIG. 7, the outline of second image g2 appearing at farther position T2 is indicated by a dashed line.

First image g1 and second image g2 appear in different positions in the depth direction. Therefore, when the user's viewpoint is shifted to the left or right, first image g1 and second image g2 will be misaligned to the left and right, as illustrated in the state before adjustment in FIG. 7. Controller 50 therefore obtains the amount of misalignment between the viewpoint position of the user and the reference position based on the user information transmitted from user detector 40. Controller 50 adjusts at least one of the position of first image g1 or the position of second image g2 from the amount of misalignment, thereby reducing the misalignment of first image g1 and second image g2 as the state after the adjustment illustrated in FIG. 7.

Figure 8:
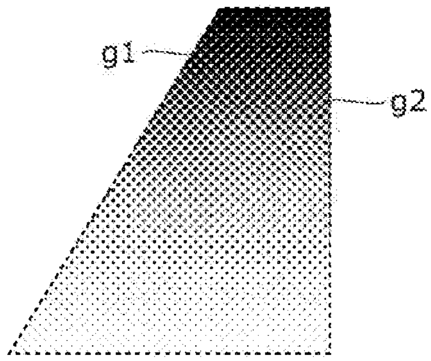
FIG. 8 is an explanatory diagram illustrating a state of the first image and the second image after shape adjustment according to Embodiment 1.

Controller 50 may also adjust at least one of the shape of first image g1 or the shape of second image g2 based on the result of detection performed by user detector 40. FIG. 8 is an explanatory diagram illustrating a state of first image g1 and second image g2 after shape adjustment according to Embodiment 1. In FIG. 8, the outline of second image g2 appearing at farther position T2 is indicated by a dashed line.

For example, even when road R1 extends straight ahead from the vehicle, when the viewpoint of the user is shifted to the left or right, road R1 will also tilt accordingly. In this way, at least one of the shape of first image g1 or the shape of second image g2 is adjusted by controller 50 in view of the viewpoint position of the user, so that first image g1 and second image g2 correspond to the viewpoint position of the user as illustrated in FIG. 8.

Figure 9A:
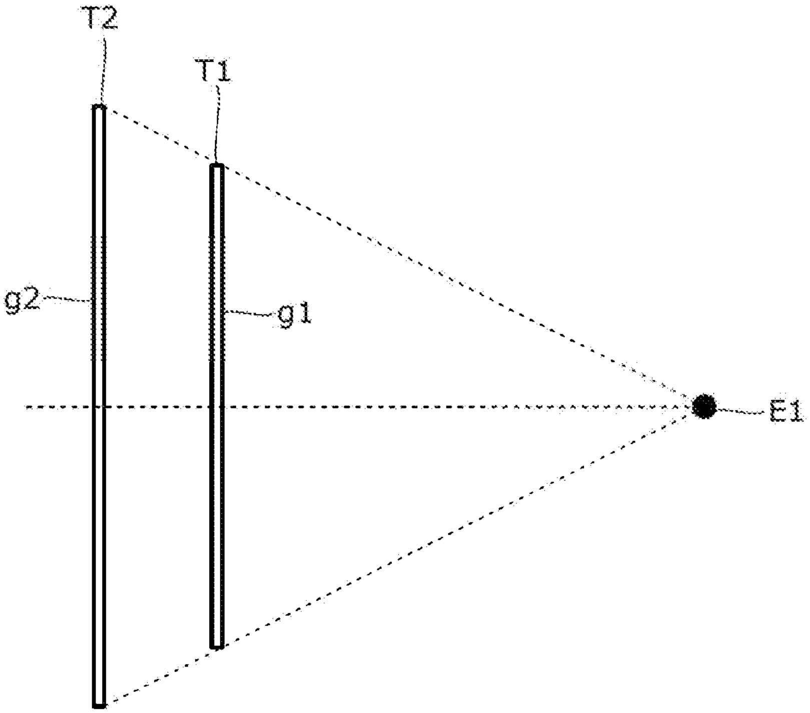
FIG. 9A is an explanatory diagram illustrating a relationship between the first and second images and the user's viewpoint position seen from above according to Embodiment 1.
Figure 9B:
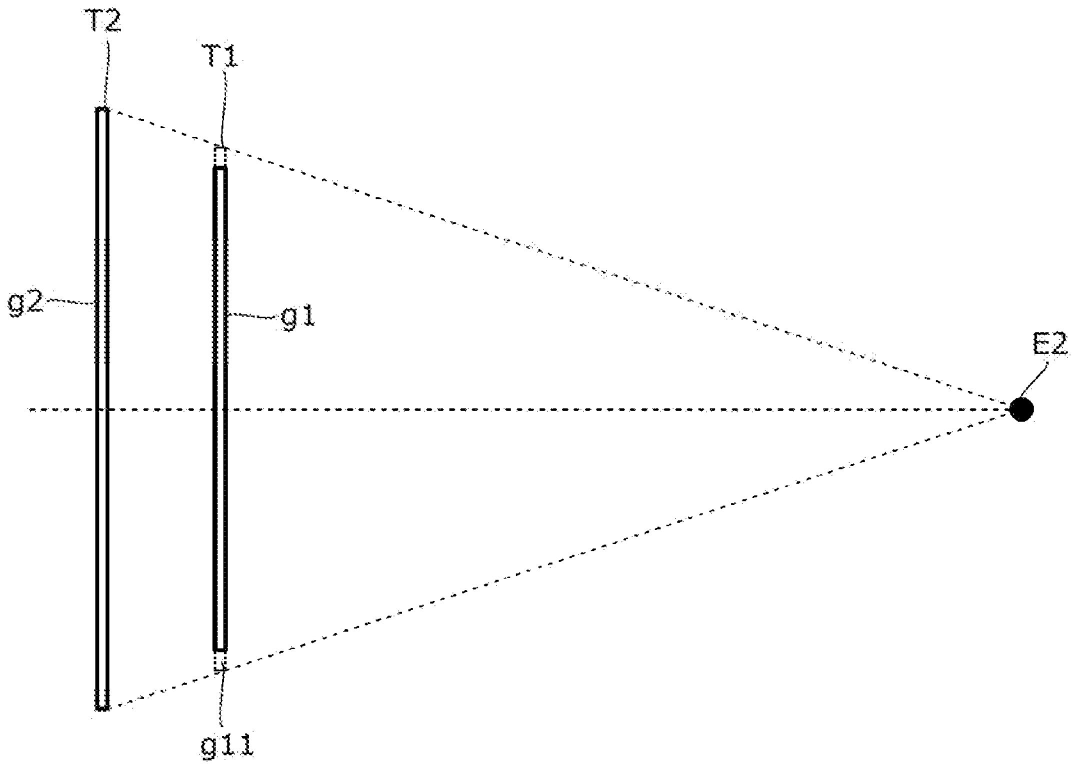
FIG. 9B is an explanatory diagram illustrating a relationship between the first and second images and the user's viewpoint position seen from above according to Embodiment 1.

Controller 50 may also adjust a first one of the magnification of first image g1 or the magnification of second image g2 relative to a second one of the magnification of first image g1 or the magnification of second image g2 based on the result of detection performed by user detector 40. FIG. 9A and FIG. 9B are explanatory diagrams illustrating the relationship between first and second images g1 and g2 and the user's viewpoint position seen from above according to Embodiment 1. First image g1 appears at closer position T1 and second image g2 appears at farther position T2.

FIG. 9A illustrates the case where user's viewpoint position E1 is at the reference position. In this case, the relative magnifications of first image g1 and second image g2 are set such that when the user views first image g1 and second image g2 from viewpoint position E1, first image g1 and second image g2 exactly overlap each other.

FIG. 9B illustrates the case where user's viewpoint position E2 is farther away from closer position T1 than the reference position is. When the relative magnifications of first image g1 and second image g2 are the same as those in FIG. 9A, first image g1 looks smaller than second image g2 from the user at viewpoint position E2. Therefore, controller 50 obtains a first distance between user's viewpoint position E2 and closer position T1 and a second distance between user's viewpoint position E2 and farther position T2, based on the result of detection performed by user detector 40. Controller 50 then adjusts the magnification of first image g1 based on the first distance and the second distance such that first image g1 matches second image g2 from the user at viewpoint position E2. First image g1 with an adjusted magnification is enlarged and overlaps second image g2 (see adjusted first image g11 in FIG. 9B).

In addition, it is highly likely that only one of the first state or the second state can be performed in the event of abnormality of optical element 30. In other words, it is highly likely that only two-dimensional display is performed. Therefore, when controller 50 detects an abnormality in optical element 30, controller 50 causes display 20 to output a third image corresponding to the abnormality. The third image may be any image corresponding to a two-dimensional display. For example, base image G may be used as the third image. Alternatively, when only the first state is performed, first image g1 may be used as the third image, and when only the second state is performed, second image g2 may be used as the third image.

As described above, according to the present embodiment, optical element 30 is switched between the first state and the second state in synchronization with the repeated output of first image g1 and second image g2 in an alternating manner. In other words, when first image g1 is output, optical element 30 is in the first state, and the image light forming first image g1 is reflected by optical element 30 and reaches the user. On the other hand, when second image g2 is output, optical element 30 is in the second state, and the image light forming second image g2 passes through optical element 30, is reflected by first reflector 25, and reaches the user. With this, the viewing distance of the image light forming second image g2 is longer than the viewing distance of the image light forming first image g1. When first image g1 is a closer image and second image g2 is a farther image, the closer image is projected closer to the user and the farther image is projected farther away from the user. Accordingly, the user is able to visually recognize a three-dimensional image. In such a manner, a three-dimensional image can be generated even without a plurality of displays 20.

In addition, since first polarizing plate 32 of optical element 30 is a transmissive polarizing plate, unwanted reflected light can be further reduced than when first polarizing plate 32 is a reflective polarizing plate.

In the event of an abnormality in optical element 30, a third image corresponding to the abnormality can be output from display 20. Therefore, even in abnormal situations where three-dimensional images cannot be generated, a third image corresponding to a two-dimensional image can be output, so that a two-dimensional image can be displayed.

At least one of the position of first image g1 or the position of second image g2 is adjusted based on the user detected by user detector 40, so that degradation of the three-dimensional image due to ghost images can be reduced.

At least one of the shape of first image g1 or the shape of second image g2 is adjusted based on the user detected by user detector 40, so that a three-dimensional image suitable for the user can be generated.

A first one of the magnification of first image g1 or the magnification of second image g2 relative to a second one of the magnification of first image g1 or the magnification of second image g2 is adjusted based on the user detected by user detector 40, so that first image g1 and second image g2 can be overlapped to each other appropriately.

Embodiment 2

Embodiment 2 will be described. Note that since like configurations in the following description and Embodiment 1 share like reference numerals, description of those configurations may be omitted.

Figure 10:
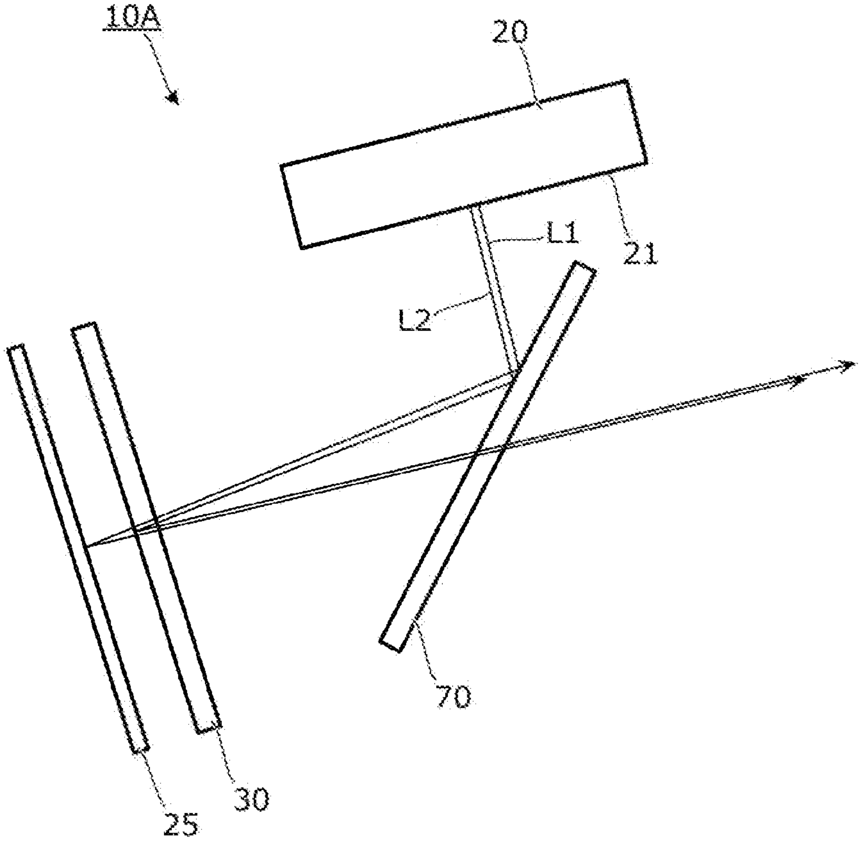
FIG. 10 is a schematic diagram illustrating a configuration of a display device according to Embodiment 2.

FIG. 10 is a schematic diagram illustrating a configuration of display device 10A according to Embodiment 2. As illustrated in FIG. 10, display device 10A includes half mirror 70 positioned between display 20 and optical element 30. In FIG. 10, the image light forming first image g1 is assigned with reference numeral L1 and image light forming second image g2 is assigned with reference numeral L2.

Half mirror 70 is, for example, a flat optical component with a metal film deposited on a glass base material. Half mirror 70 is arranged in an orientation to reflect, towards optical element 30, image light L1 and L2 emitted from display 20 and to transmit image light L1 and L2 reflected by optical element 30 or first reflector 25. Furthermore, half mirror 70 is arranged in an orientation that causes image light L1 and L2 reflected by half mirror 70 to enter optical element 30 substantially perpendicularly.

As half mirror 70 is arranged between display 20 and optical element 30 in such a manner, half mirror 70 reflects image light L1 and L2 to allow image light L1 and L2 to enter optical element 30 substantially perpendicularly. A characteristic of first polarizing plate 32 in optical element 30 is that the degree of polarization increases the more perpendicularly light enters first polarizing plate 32. Therefore, half mirror 70 is capable of increasing the degree of separation of polarized light, leading to an increase in image quality.

Embodiment 3

Figure 11A:
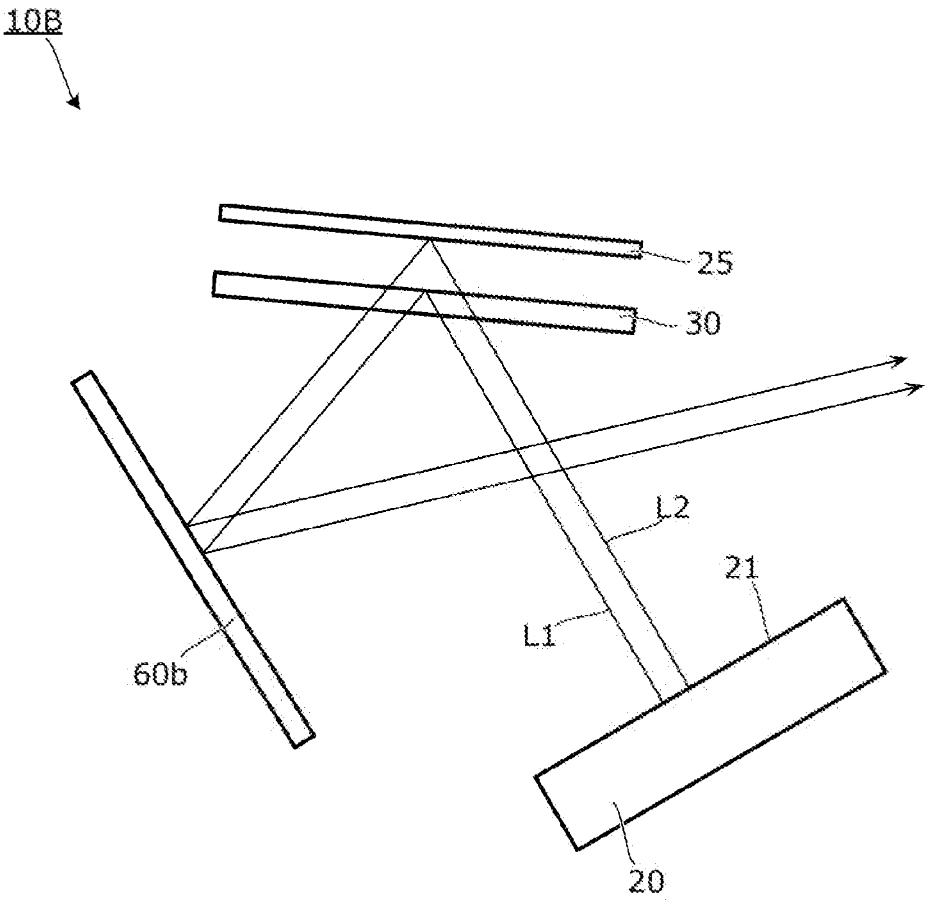
FIG. 11A is a schematic diagram illustrating a first example of a display device according to Embodiment 3.

Embodiment 3 will be described. A display device according to Embodiment 3 includes a second reflector arranged on the optical path of the image light emitted from the display. The second reflector is an optical component that further reflects the image light reflected by optical element 30 or first reflector 25. The second reflector may be a flat total reflective mirror, or a concave mirror or a convex mirror. Furthermore, the second reflector may be a lens-mirror hybrid element FIG. 11A is a schematic diagram illustrating display device 10B that is a first example according to Embodiment 3. As illustrated in FIG. 11A, in display device 10B, display 20 is arranged in an orientation in which display surface 21 faces diagonally upwards to the front of vehicle 1. Optical element 30 and first reflector 25 are positioned above display 20 and opposite to display surface 21. Second reflector 60*b* is positioned to reflect, towards opening 29 of center console 2, image light L1 and L2 reflected by optical element 30 or first reflector 25.

Figure 11B:
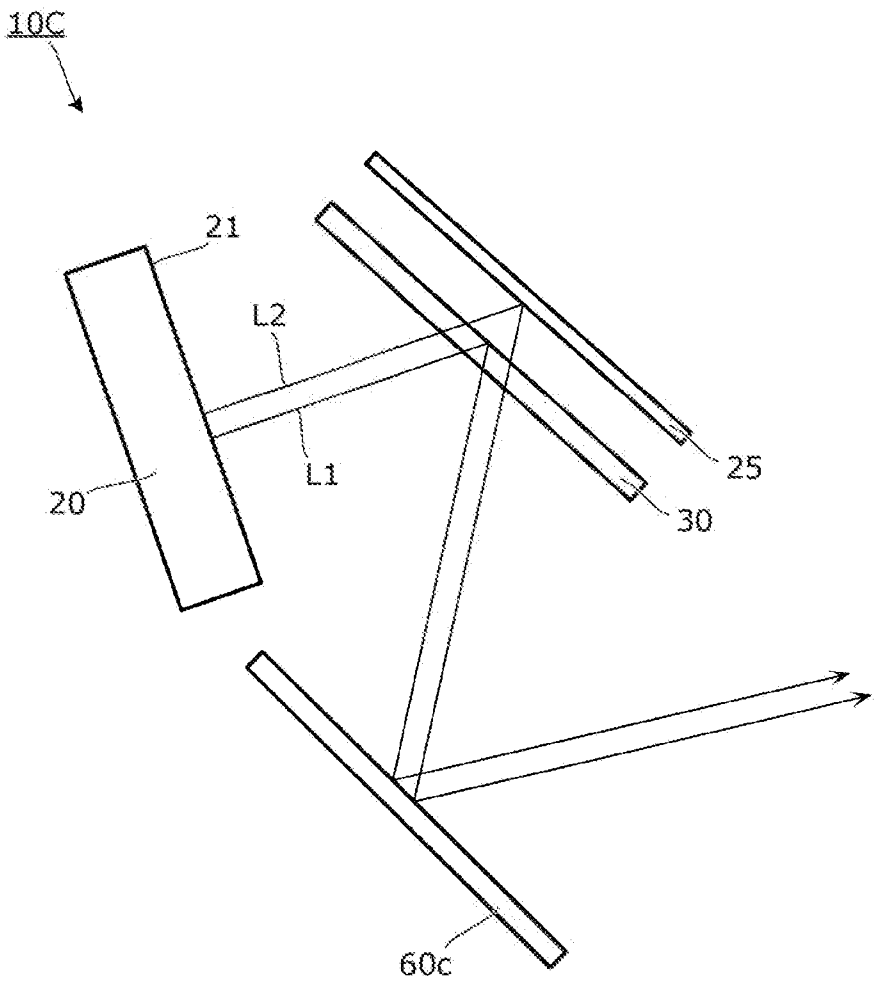
FIG. 11B is a schematic diagram illustrating a second example of the display device according to Embodiment 3.

FIG. 11B is a schematic diagram illustrating display device 10C that is a second example according to Embodiment 3. As illustrated in FIG. 11B, in display device 10C, display 20 is arranged in an orientation in which display surface 21 faces diagonally upwards to the rear of vehicle 1. Optical element 30 and first reflector 25 are positioned behind display 20 and opposite to display surface 21. Second reflector 60*c* is positioned to reflect, towards opening 29 of center console 2, image light L1 and L2 reflected by optical element 30 or first reflector 25.

Figure 11C:
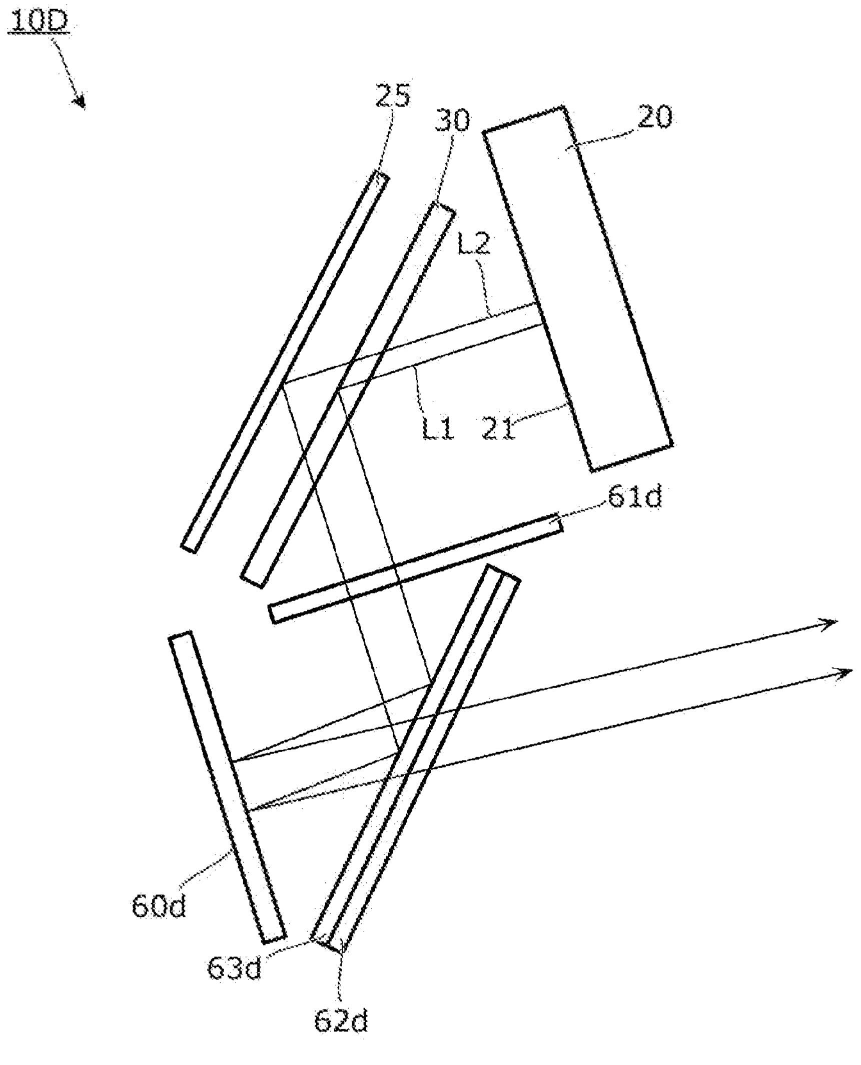
FIG. 11C is a schematic diagram illustrating a third example of the display device according to Embodiment 3.

FIG. 11C is a schematic diagram illustrating display device 10D that is a third example according to Embodiment 3. As illustrated in FIG. 11C, in display device 10D, display 20 is arranged in an orientation in which display surface 21 faces diagonally downwards and frontwards of vehicle 1. Optical element 30 and first reflector 25 are positioned in front of display 20 and opposite to display surface 21. First λ/4 plate 61*d* is disposed below optical element 30 and first reflector 25. A stack of reflective polarizing plate 62*d* and second λ/4 plate 63*d* is disposed below first λ/4 plate 61*d*.

First λ/4 plate 61*d* and second λ/4 plate 63*d* are λ/4 retarder plates. The λ/4 retarder plate is an optical component for converting linearly polarized light incident on the λ/4 retarder plate to circularly polarized light and converting the circularly polarized light incident on the λ/4 retarder plate to linearly polarized light.

For example, when p-polarized image light L1 and L2 is emitted from display 20, image light L1 and L2 is reflected by optical element 30 or first reflector 25 and passes through first λ/4 plate 61*d*, so that image light L1 and L2 is converted to circularly polarized light (for example, p+ polarized light). Subsequently, p+ polarized image light L1 and L2 passes through second λ/4 plate 63*d*, so that p+ polarized image light L1 and L2 is converted to s-polarized light. Since reflective polarizing plate 62*d* reflects s-polarized light and transmits p-polarized light, s-polarized image light L1 and L2 is reflected by reflective polarizing plate 62*d*. Immediately after the reflection, s-polarized image light L1 and L2 is converted to circularly polarized light (e.g. s+ polarized light) by passing through second λ/4 plate 63*d* again.

Second reflector 60*d* is positioned to reflect, towards opening 29 of center console 2, s+ polarized image light L1 and L2. S+ polarized image light L1 and L2 reflected by second reflector 60*d* is converted to p-polarized light by further passing through second λ/4 plate 63*d*. This causes p-polarized image light L1 and L2 to pass through reflective polarizing plate 62*d* and travel towards opening 29.

In this way, second reflectors 60*b*, 60*c* and 60*d* reflect image light L1 and L2, so that the viewing distance of image light L1 and L2 can be increased. Therefore, it is possible to generate a three-dimensional image with a greater sense of depth.

The second reflector may be positioned to reflect, towards the optical element and the first reflector, the image light emitted from the display.

Embodiment 4

Figure 12A:
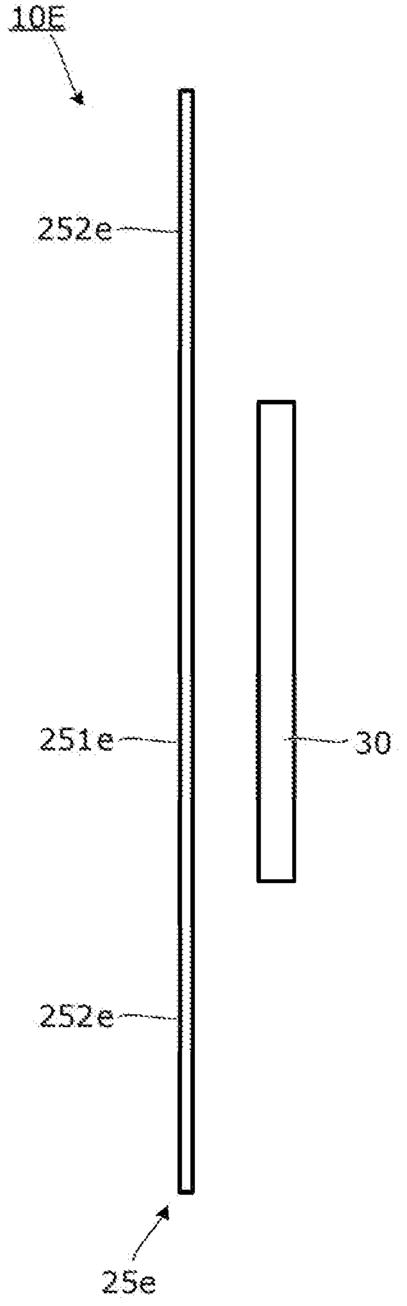
FIG. 12A is a top view of an optical element and a first reflector in a display device according to Embodiment 4
Figure 12B:
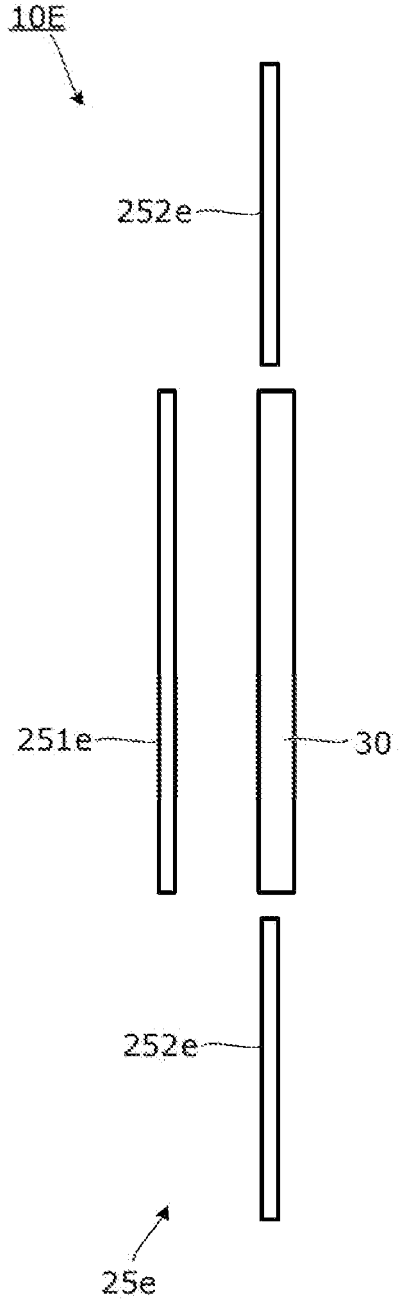
FIG. 12B is a top view of the optical element and the first reflector in the display device according to Embodiment 4

In Embodiment 4, display device 10E capable of collectively performing three-dimensional display and two-dimensional display will be described. FIG. 12A and FIG. 12B each is a top view of optical element 30 and first reflector 25*e* included in display device 10E according to Embodiment 4. As illustrated in FIG. 12A, first reflector 25*e* is larger than optical element 30. Optical element 30 is arranged opposite to the central portion of first reflector 25*e*. In first reflector 25*e*, the region opposite optical element 30 is first region 251*e* and the other regions are second regions 252*e*. In other words, each second region 252*e* is a region positioned not directly opposite to optical element 30. As illustrated in FIG. 12B, first reflector 25*e* may be divided into first region 251*e* and second regions 252*e*.

Display 20 emits image light corresponding to the size of first reflector 25*e*. Controller 50 causes display 20 to generate first image g1 and second image g2 to fit within first region 251*e*, and two-dimensional display images to fit within second regions 252*e*.

Figure 13:
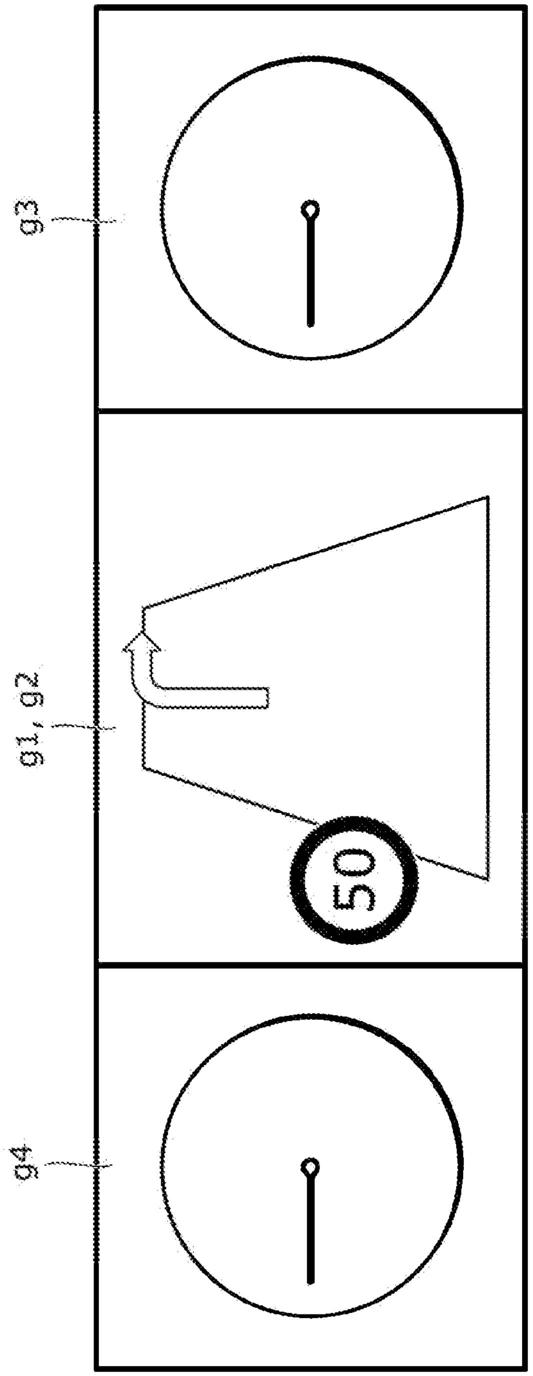
FIG. 13 is an explanatory diagram illustrating images displayed on the display device according to Embodiment 4.

FIG. 13 is an explanatory diagram illustrating images displayed on display device 10E according to Embodiment 4. As illustrated in FIG. 13, a three-dimensional display image (first and second images g1 and g2) is displayed in the central portion and two-dimensional display images (speed meter image g3 and tachometer image g4) are displayed at both ends.

In such a manner, a three-dimensional image can be generated in first region 251*e*, while two-dimensional images can be generated in second regions 252*e*. Accordingly, a three-dimensional image and two-dimensional images can be represented collectively. Furthermore, the size of optical element 30 can be reduced, because optical element 30 only needs to have a size corresponding to only first region 251*e* of first reflector 25*e*.

Embodiment 5

Figure 14:
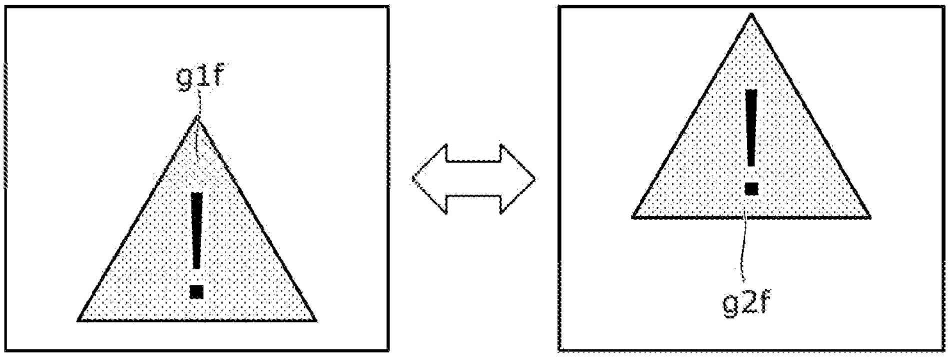
FIG. 14 is an explanatory diagram illustrating an example of an image displayed on a display device according to Embodiment 5.

In Embodiment 5, the case where highlighting is performed by controller 50 will be described. FIG. 14 is an explanatory diagram illustrating an example of an image display according to Embodiment 5. FIG. 14 illustrates the case where first image g1*f*, which appears at closer position T1, and second image g2*f*, which appears at farther position T2, are switched alternately. First image g1*f* and second image g2*f* are identical to each other. In the present embodiment, an example is described where first image g1*f* and second image g2*f* are warning images. First image g1*f* is the image light displayed in the first state and second image g2*f* is the image light displayed in the second state.

When controller 50 causes display 20 to repeatedly output first image g1*f* and second image g2*f* in an alternating manner, controller 50 switches optical element 30 between the first state and the second state in synchronization with first image g1*f* and second images g2*f*. At this time, controller 50 repeatedly switches optical element 30 between the first state and the second state every predetermined period. In other words, switching is performed between first image g1*f* displayed at closer position T1 for a predetermined period and second image g2*f* displayed at further position T2 for a predetermined period. The predetermined period is the time period that allows the switching to be visually recognized by the user, e.g. within a range from at least 0.3 seconds and at most 0.8 seconds.

In such a manner, when display 20 repeatedly outputs first image g1*f* and second image g2*f* in an alternating manner, optical element 30 is repeatedly switched between the first state and the second state every predetermined period that allows the switching to be visually recognized. Since first image g1*f* and second image g2*f* are identical to each other, the identical image is displayed at different viewing distances. The images are highlighted in this way. This makes it easier for the user to notice the images.

Here, controller 50 causes display 20 to repeatedly output first image g1*f* and second image g2*f*, which are the identical image, in an alternating manner. For example, it may be that controller 50 causes display 20 to always display only first image g1*f* and switches optical element 30 between the first state and the second state every predetermined period. In this case, the identical image is also displayed at different viewing distances.

Embodiment 6

Figure 15:
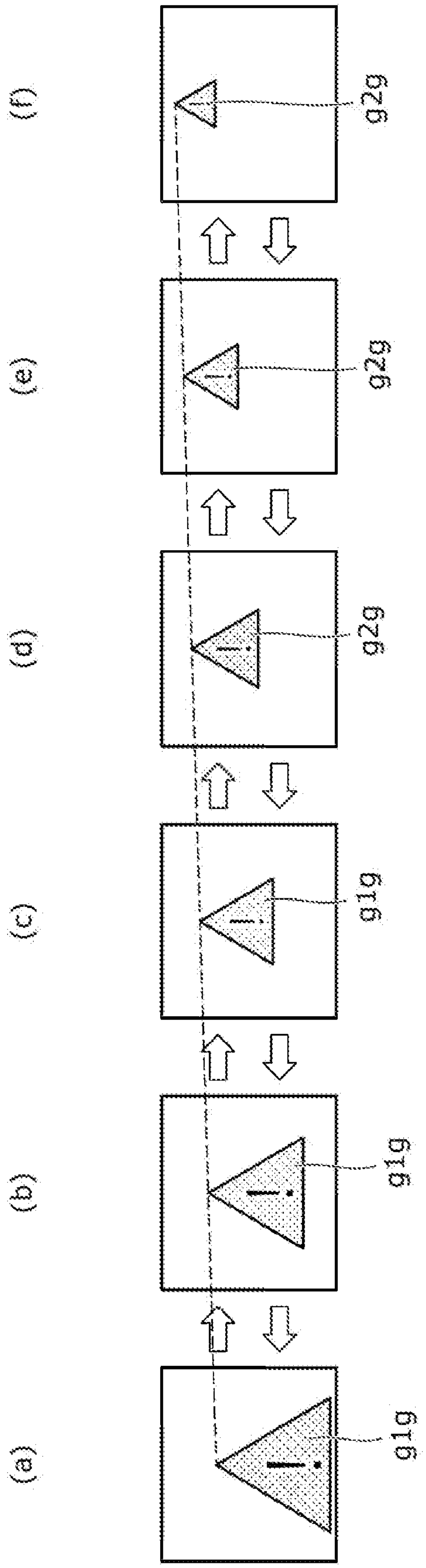
FIG. 15 is an explanatory diagram illustrating an example of an image displayed on a display device according to Embodiment 6

In Embodiment 6, the case where highlighting is performed in another manner by controller 50 will be described. FIG. 15 is an explanatory diagram illustrating an example of an image display according to Embodiment 6. FIG. 15 illustrates the case where the size of first image g1*g* appearing at closer position T1 changes and the size of second image g2*g* appearing at farther position T2 changes. In the present embodiment, an example will be described where first image g1*g* and second image g2*g* are warning images. First image g1*g* is the image light displayed in the first state and second image g2*g* is the image light displayed in the second state.

Controller 50 (*i*) causes display 20 to output first image g1*g* of an initial size while keeping optical element 30 in the first state ((a) in FIG. 15), and then gradually reduce the size of first image g1*g* to a first predetermined size that is smaller than the initial size ((a) to (b) to (c) in FIG. 15). Here, the uppermost part of first image g1*g* (vertex of the triangle in the case of FIG. 15) gradually moves upwards along the virtual line indicated by the dashed line. This causes first image g1*g* to become gradually smaller at closer position T1. In FIG. 15, (c) illustrates first image g1*g* of a first predetermined size.

Controller 50 then (ii) switches optical element 30 to the second state after first image gig reaches the first predetermined size (at the point between (c) and (d) in FIG. 15).

Controller 50 then (iii) causes display 20 to output second image g2*g* while keeping optical element 30 in the second state. At this time, controller 50 sets the size of second image g2*g* (triangle) illustrated in (d) of FIG. 15 to a second predetermined size that is smaller than the first predetermined size of first image g1*g* illustrated in (c) of FIG. 15. Controller 50 then causes display 20 to output second image g2*g* to gradually reduce the size of second image g2*g* from the second predetermined size in (d) in FIG. 15 to a third predetermined size that is smaller than the second predetermined size ((d) to (e) to (f) in FIG. 15). The uppermost part of second image g2*g* (vertex of the triangle) also gradually moves upwards along the virtual line indicated by the dashed line. This causes second image g2*g* to become gradually smaller at farther position T2. First image g1*g* and second image g2*g* are represented as moving towards the back with time, as the virtual line is set diagonally upwards to the right in FIG. 15. In FIG. 15, (f) illustrates second image g2*g* of the third predetermined size.

Controller 50 then (iv) causes display 20 to output second image g2*g* to gradually increase the size of second image g2*g* to the second predetermined size after reaching the third predetermined size ((f) to (e) to (d) in FIG. 15). Here, the uppermost part of second image g2*g* (vertex of the triangle) gradually moves downwards along the virtual line indicated by the dashed line. This causes second image g2*g* to become gradually larger at farther position T2.

Next, controller 50 (*v*) switches optical element 30 to the first state after the size of second image g2*g* reaches the second predetermined size (at the point between (c) and (d) in FIG. 15).

Next, controller 50 (*vi*) causes display 20 to output first image g1*g* to gradually increase the size of first image g1*g* from the first predetermined size illustrated in (c) of FIG. 15 to the initial size while keeping optical element 30 in the first state. ((c) to (b) to (a) in FIG. 15). Here, too, the uppermost part of first image g1*g* (vertex of the triangle) gradually moves downwards along the virtual line indicated by the dashed line. This causes first image g1*g* to become gradually larger at closer position T1. Second image g2*g* and first image g1*g* are represented as moving towards the front with time, because the virtual line is set diagonally upwards to the right in FIG. 15.

Controller 50 repeats operations (i) to (vi). This causes first image g1*g* and second image g2*g* to move towards the back while becoming smaller or move towards the front while becoming larger in an animated manner. The size may be changed every time period that allows smooth animation expression, e.g. 0.2±0.1 seconds.

In this way, the size of first image g1*g* and the size of second image g2*g* are increased or reduced in an animated manner. This makes it easier for the user to notice first image g1*g* and second image g2*g*.

Embodiment 7

Figure 16:
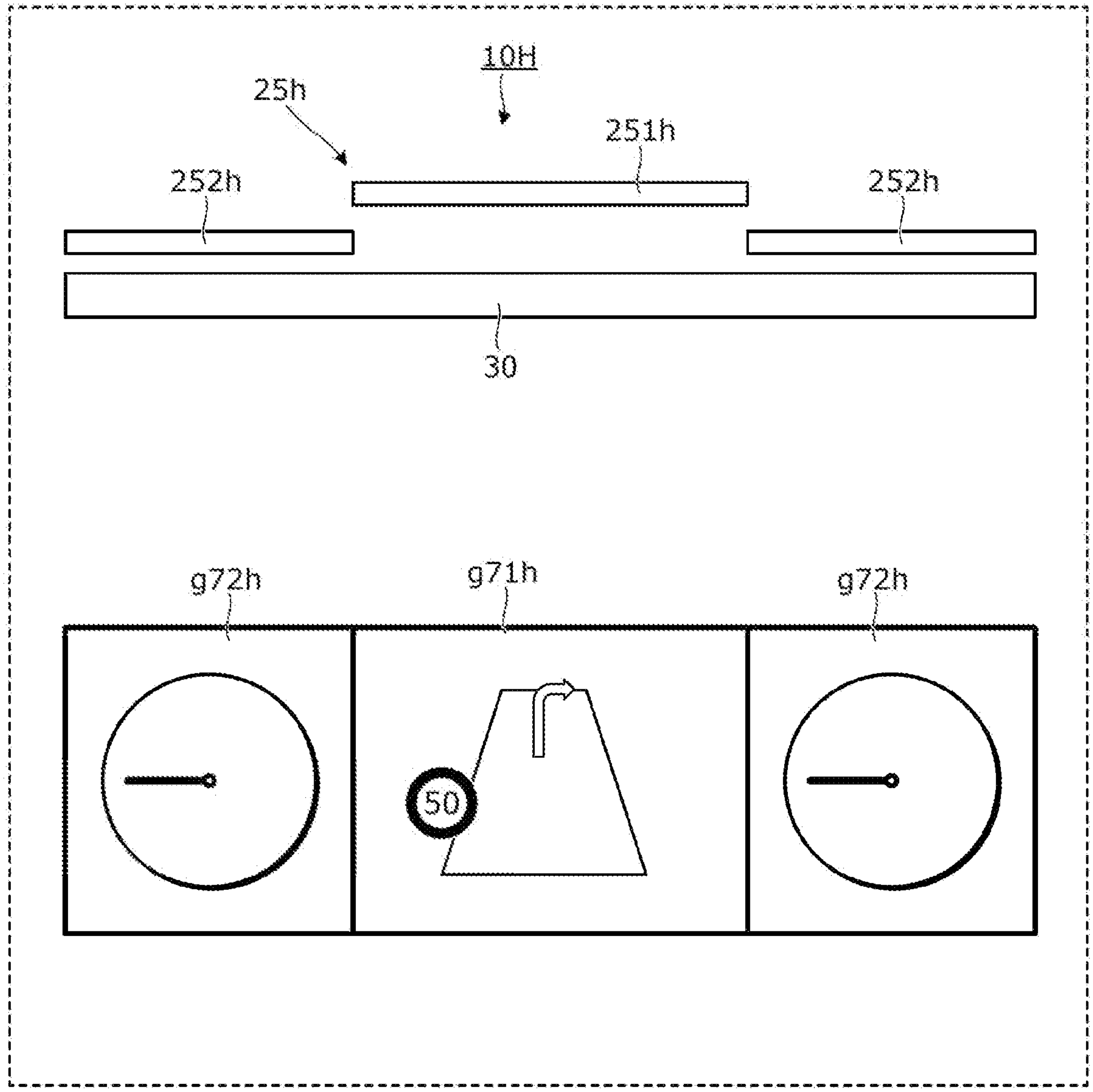
FIG. 16 is an explanatory diagram illustrating an optical element and a first reflector included in a display device and displayed images according to Embodiment 7.

In Embodiment 7, display device 10H capable of setting different viewing distances for respective regions will be described. FIG. 16 is an explanatory diagram illustrating part of display device 10H and a display example according to Embodiment 7. FIG. 16 is a top view of optical element 30 and first reflector 25*h* included in display device 10H.

As illustrated in FIG. 16, first reflector 25*h* is divided into three regions in the width direction. Each of the divided reflective regions (first reflective region 251*h*, a pair of second reflective regions 252*h*) is positioned opposite to optical element 30. Specifically, first reflective region 251*h* is opposite to the central portion of optical element 30, and a pair of second reflective regions 252*h* are opposite to the two end portions of optical element 30. The distance between first reflective region 251*h* and optical element 30 is different from the distance between each second reflective region 252*h* and optical element 30. Specifically, the distance between first reflective region 251*h* and optical element 30 is longer than the distance between each second reflective region 252*h* and optical element 30. Therefore, the viewing distance of the image formed by the image light reflected by first reflective region 251*h* can be set longer than the viewing distance of the image formed by the image light reflected by second reflective region 252*h*.

For example, on display 20, navigation image g71*h* is displayed as an image corresponding to the central portion of optical element 30 and meter images g72*h* are displayed as images corresponding to the both ends of optical element 30. As described before, the distance between first reflective region 251*h* and optical element 30 is longer than the distance between second reflective region 252*h* and optical element 30. Therefore, navigation image g71*h* is capable of representing a longer depth than meter images g72*h* for the user. Accordingly, a three-dimensional display with two depth lengths is possible.

In such a manner, the viewing distance of the image formed by the image light reflected by first reflective region 251*h* can be set different from the viewing distance of the image formed by the image light reflected by second reflective region 252*h*. This makes it possible to simultaneously realize a three-dimensional display by switching of optical element 30 and a three-dimensional display by differences in viewing distance, thus enabling a wider variety of three-dimensional displays.

Furthermore, it is also possible to arrange first reflective region 251*h* and second reflective regions 252*h* to correspond to the shape of the portion where optical element 30 is provided by differentiating the distance between first reflective region 251*h* and optical element 30 and the distance between each second reflective region 252*h* and optical element 30. Therefore, the degree of freedom of vehicle mounting can be increased.

In the present embodiment, first reflector 25*h* is divided into three regions, but first reflector 25*h* may be divided into two regions or four or more regions. Moreover, in the present embodiment, first reflector 25*h* has two different distances from the optical element, but may have three or more different distances.

Embodiment 8

Figure 17:
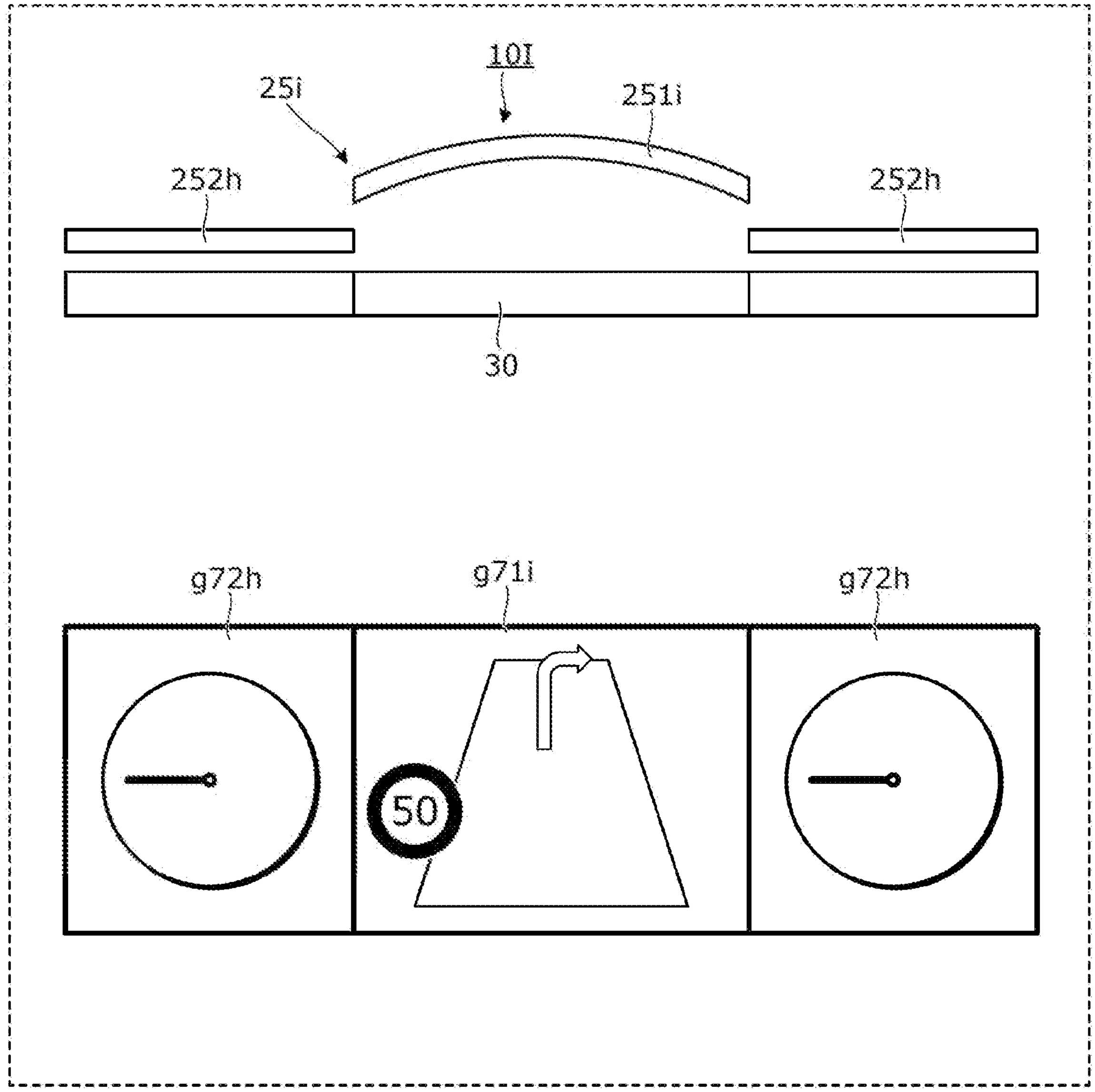
FIG. 17 is an explanatory diagram illustrating an optical element and a first reflector included in a display device and displayed images according to Embodiment 8.

In Embodiment 8, the case where the first reflective region is a concave mirror will be described. FIG. 17 is an explanatory diagram illustrating part of display device 10I and a display example according to Embodiment 8. FIG. 17 corresponds to FIG. 16. Note that since like configurations in Embodiment 8 and Embodiment 7 share like reference numerals, description of those configurations may be omitted.

As illustrated in FIG. 17, in first reflector 25*i*, first reflective region 251*i* is a concave mirror. Furthermore, controller 50 keeps portion of optical element 30 corresponding to first reflective region 251*i* only in the second state. With this, navigation image g71*i* is not displayed three-dimensionally, but the concave mirror of first reflective region 251*i* allows navigation image g71*i* to be displayed farther than the image reflected by second reflective region 252*h*, providing a sense of depth.

In such a manner, since first reflective region 251*i* is a concave mirror, navigation image g71*i* formed by the image light reflected by first reflective region 251*i* provides a sense of depth.

Embodiment 9

Figure 18:
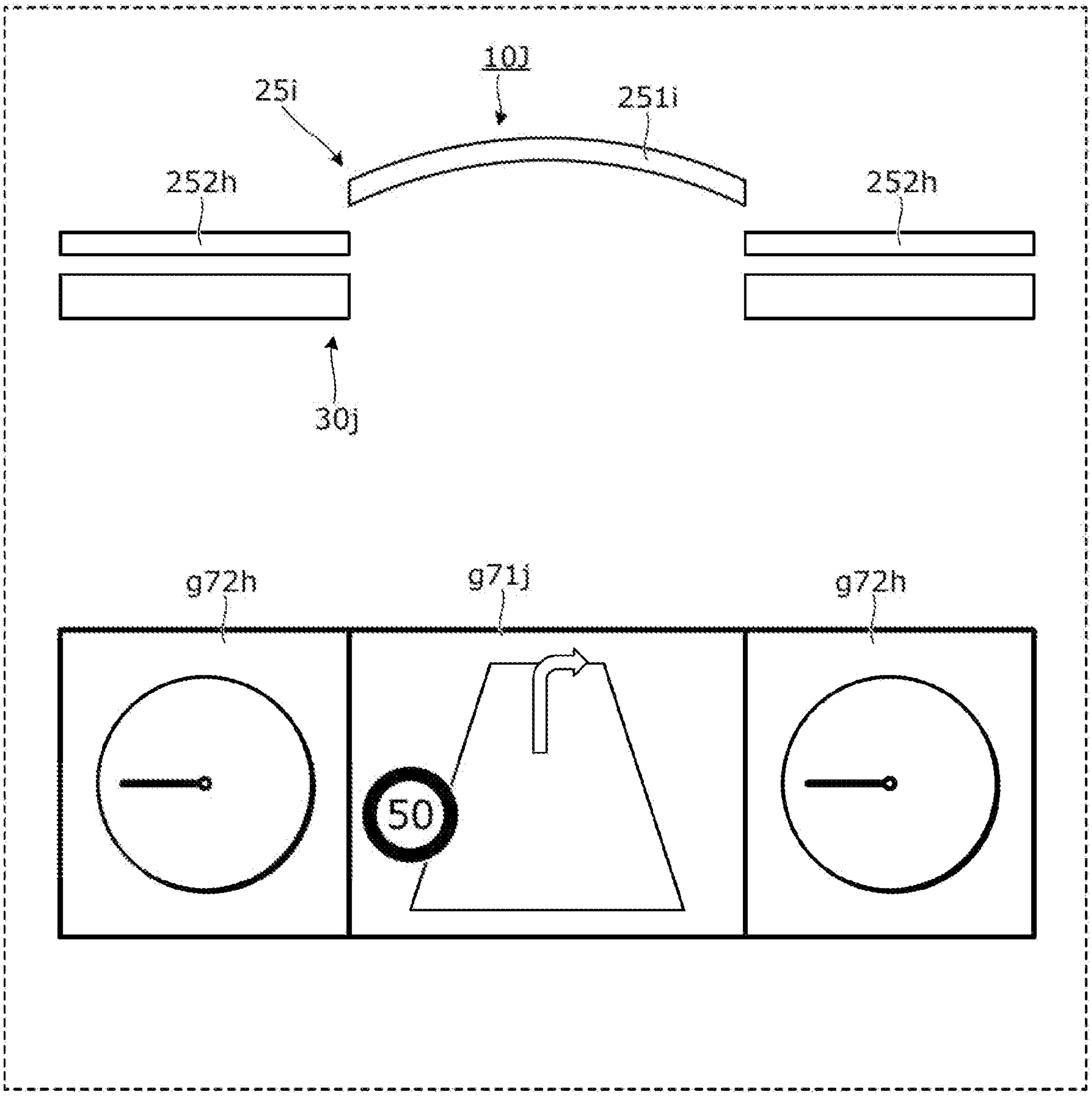
FIG. 18 is an explanatory diagram illustrating an optical element and a first reflector included in a display device and displayed images according to Embodiment 9.

In Embodiment 9, the case where the optical element exposes the first reflective region will be described. FIG. 18 is an explanatory diagram illustrating part of display device 10J and a display example according to Embodiment 9. FIG. 18 corresponds to FIG. 17. Note that since like configurations in Embodiment 9 and Embodiment 8 share like reference numerals, description of those configurations may be omitted.

As illustrated in FIG. 18, optical element 30*j* exposes first reflective region 251*i*. Specifically, optical element 30*j* may be divided in the width direction and arranged avoiding first reflective region 251*i*, or may include an opening to expose first reflective region 251*i*. With this, the light forming navigation image g71*j* does not pass through liquid crystal layer 31, first polarizing plate 32, and second polarizing plate 33, so that navigation image g71*j* is displayed with reduced light attenuation and a sense of depth is provided.

Since first reflective region 251*i* is exposed in optical element 30*j* as described above, light attenuation can be reduced in navigation image g71*j*, allowing for easy visibility and a wider variety of displays.

(Others)

Although the display device and the display system according to one or more aspects of the present disclosure have been described based on the embodiments, the present disclosure is not limited to the embodiments. Various modifications of the embodiments as well as embodiments resulting from arbitrary combinations of structural elements of the embodiments that may be conceived by those skilled in the art may be included one or more aspects of the present disclosure as long as these do not depart from the essence of the present disclosure.

(Additional Information)

The techniques described below are disclosed according to the description of the embodiments and the like above.

[Technique 1]

A display device including:

a display that emits image light;

an optical element that is disposed away from the display, the optical element being switchable between a first state in which the optical element reflects the image light and a second state in which the optical element transmits the image light;

a first reflector that is disposed on an opposite side of the optical element relative to a side on which the display is disposed; and a controller that controls the display and the optical element, wherein, when causing the display to repeatedly output a first image and a second image in an alternating manner, the controller switches the optical element between the first state and the second state in synchronization with the first image and the second image.

[Technique 2]

The display device according to technique 1, wherein the optical element includes a liquid crystal layer, and a first polarizing plate and a second polarizing plate that sandwich the liquid crystal layer, the first polarizing plate is a transmissive polarizing plate where the image light enters, and the second polarizing plate is a reflective polarizing plate.

[Technique 3]

The display device according to technique 1 or 2, including:

a half mirror that is disposed between the display and the optical element.

[Technique 4]

The display device according to any one of technique 1 to technique 3, including:

a second reflector that is disposed on an optical path of the image light emitted from the display.

[Technique 5]

The display device according to any one of technique 1 to technique 4, wherein the first reflector includes a first region and a second region, the first region being positioned opposite to the optical element, the second region being positioned not directly opposite to the optical element.

[Technique 6]

The display device according to any one of technique 1 to technique 5, wherein, when the controller detects an abnormality in the optical element, the controller causes the display to output a third image corresponding to the abnormality.

[Technique 7]

The display device according to any one of technique 1 to technique 6, wherein the first image is identical to the second image, and when the controller causes the display to repeatedly output the first image and the second image in an alternating manner, the controller switches the optical element between the first state and the second state every predetermined period that allows the switching to be visually recognized.

[Technique 8]

The display device according to any one of technique 1 to technique 7, wherein, when the first image is defined by the image light displayed when the optical element is in the first state and the second image is defined by the image light displayed when the optical element is in the second state, the controller: (i) causes the display to output the first image to gradually reduce a size of the first image from an initial size to a first predetermined size, while keeping the optical element in the first state, the first predetermined size being smaller than the initial size; (ii) switches the optical element to the second state after the size of the first image reaches the first predetermined size; (iii) causes the display to output the second image to gradually reduce a size of the second image from a second predetermined size to a third predetermined size, while keeping the optical element in the second state, the second predetermined size being smaller than the first predetermined size, the third predetermined size being smaller than the second predetermined size; (iv) causes the display to output the second image to gradually increase the size of the second image to the second predetermined size, when the size of the second image reaches the third predetermined size; (v) switches the optical element to the first state after the size of the second image reaches the second predetermined size; and (vi) causes the display to output the first image to gradually increase the size of the first image from the first predetermined size to the initial size, while keeping the optical element in the first state

[Technique 9]

The display device according to any one of technique 1 to technique 8, wherein the first reflector includes a first reflective region and a second reflective region that are positioned at different distances from the optical element.

[Technique 10]

The display device according to technique 9, wherein the first reflective region is positioned farther from the optical element than the second reflective region is, and the optical element includes a portion that is kept only in the second state, the portion corresponding to the first reflective region.

[Technique 11]

The display device according to technique 9, wherein the first reflective region is positioned farther from the optical element than the second reflective region is, and the optical element exposes the first reflective region.

[Technique 12]

The display device according to technique 10 or technique 11, wherein the first reflective region is a concave mirror.

[Technique 13]

A display system including:

the display device according to any one of technique 1 to technique 12.

[Technique 14]

The display system according to technique 13, including:

a user detector that detects a user who views an image that is based on the image light, wherein the controller adjusts at least one of a position of the first image or a position of the second image based on a result of detection performed by the user detector.

[Technique 15]

The display system according to technique 13 or technique 14, including:

a user detector that detects a user who views an image that is based on the image light, wherein the controller adjusts at least one of a shape of the first image or a shape of the second image based on a result of detection performed by the user detector.

[Technique 16]

The display system according to technique 13 to technique 15, including:

a user detector that detects a user who views an image that is based on the image light, wherein the controller adjusts a first one of a magnification of the first image or a magnification of the second image relative to a second one of the magnification of the first image or the magnification of the second image, based on a result of detection performed by the user detector.

While various embodiments have been described herein above, it is to be appreciated that various changes in form and detail may be made without departing from the spirit and scope of the present disclosure as presently or hereafter claimed.

FURTHER INFORMATION ABOUT TECHNICAL BACKGROUND TO THIS APPLICATION

The disclosures of the following patent applications including specification, drawings, and claims are incorporated herein by reference in their entirety: Japanese Patent Application No. 2023-086861 filed on May 26, 2023, and Japanese Patent Application No. 2023-186497 filed on Oct. 31, 2023.

INDUSTRIAL APPLICABILITY

The present disclosure is applicable to a display device and the like for displaying an image.

The invention claimed is:

1. A display device comprising:

a display that emits image light;

an optical element that is disposed away from the display and facing the display, the optical element being switchable between a first state in which the optical element reflects the image light and a second state in which the optical element transmits the image light;

a first reflector facing the optical element and reflecting the image light that has transmitted through the optical element toward the optical element; and a controller that controls the display and the optical element, wherein, in the second state, the image light emitted from the display and transmitted through the optical element is reflected by the first reflector and then directly transmitted through the optical element, and when causing the display to repeatedly output a first image and a second image in an alternating manner, the controller switches the optical element between the first state and the second state in synchronization with the first image and the second image.

2. The display device according to claim 1, wherein the optical element includes a liquid crystal layer, and a first polarizing plate and a second polarizing plate that sandwich the liquid crystal layer, the first polarizing plate is a transmissive polarizing plate where the image light enters, and the second polarizing plate is a reflective polarizing plate.

3. The display device according to claim 1, comprising:

a half mirror that is disposed between the display and the optical element.

4. The display device according to claim 1, comprising:

a second reflector that is disposed on an optical path of the image light emitted from the display.

5. The display device according to claim 1, wherein the first reflector includes a first region and a second region, the first region being positioned opposite to the optical element, the second region being positioned not directly opposite to the optical element.

6. The display device according to claim 1, wherein, when the controller detects an abnormality in the optical element, the controller causes the display to output a third image corresponding to the abnormality.

7. The display device according to claim 1, wherein the first image is identical to the second image, and when the controller causes the display to repeatedly output the first image and the second image in an alternating manner, the controller switches the optical element between the first state and the second state every predetermined period that allows the switching to be visually recognized.

8. The display device according to claim 1, wherein the first reflector includes a first reflective region and a second reflective region that are positioned at different distances from the optical element.

9. The display device according to claim 8, wherein the first reflective region is positioned farther from the optical element than the second reflective region is, and the optical element includes a portion that is kept only in the second state, the portion corresponding to the first reflective region.

10. The display device according to claim 8, wherein the first reflective region is positioned farther from the optical element than the second reflective region is, and the optical element exposes the first reflective region.

11. The display device according to claim 10, wherein the first reflective region is a concave mirror.

12. A display system comprising:

the display device according to claim 1.

13. The display system according to claim 12, comprising:

a user detector that detects a user who views an image that is based on the image light, wherein the controller adjusts at least one of a position of the first image or a position of the second image based on a result of detection performed by the user detector.

14. The display system according to claim 12, comprising:

a user detector that detects a user who views an image that is based on the image light, wherein the controller adjusts at least one of a shape of the first image or a shape of the second image based on a result of detection performed by the user detector.

15. The display system according to claim 12, comprising:

a user detector that detects a user who views an image that is based on the image light, wherein the controller adjusts a first one of a magnification of the first image or a magnification of the second image relative to a second one of the magnification of the first image or the magnification of the second image, based on a result of detection performed by the user detector.

16. A display device comprising:

a display that emits image light;

an optical element that is disposed away from the display, the optical element being switchable between a first state in which the optical element reflects the image light and a second state in which the optical element transmits the image light;

a first reflector that is disposed on an opposite side of the optical element relative to a side on which the display is disposed; and a controller that controls the display and the optical element, wherein, when causing the display to repeatedly output a first image and a second image in an alternating manner, the controller switches the optical element between the first state and the second state in synchronization with the first image and the second image, and wherein, when the first image is defined by the image light displayed when the optical element is in the first state and the second image is defined by the image light displayed when the optical element is in the second state, the controller:

(i) causes the display to output the first image to gradually reduce a size of the first image from an initial size to a first predetermined size, while keeping the optical element in the first state, the first predetermined size being smaller than the initial size;

(ii) switches the optical element to the second state after the size of the first image reaches the first predetermined size;

(iii) causes the display to output the second image to gradually reduce a size of the second image from a second predetermined size to a third predetermined size, while keeping the optical element in the second state, the second predetermined size being smaller than the first predetermined size, the third predetermined size being smaller than the second predetermined size;

(iv) causes the display to output the second image to gradually increase the size of the second image to the second predetermined size, when the size of the second image reaches the third predetermined size;

(v) switches the optical element to the first state after the size of the second image reaches the second predetermined size; and (vi) causes the display to output the first image to gradually increase the size of the first image from the first predetermined size to the initial size, while keeping the optical element in the first state.

* * * * *